Dec. 30, 1952 D. J. WARD 2,623,635
DEVICE FOR SORTING COMESTIBLES
Filed Oct. 22, 1948 13 Sheets-Sheet 2
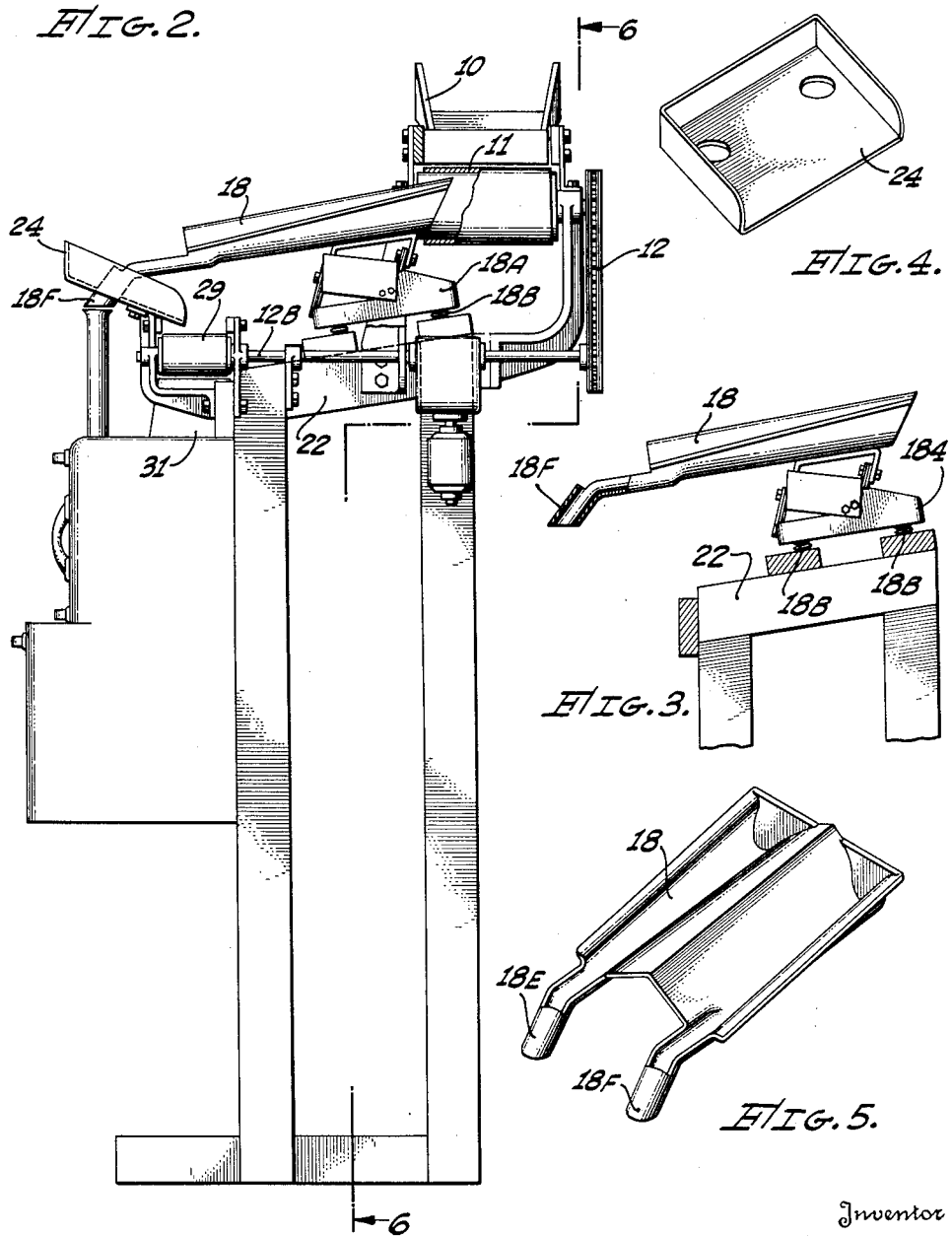
Inventor
DELBERT J. WARD
By Lyon & Lyon
Attorneys Dec. 30, 1952 D. J. WARD 2,623,635
DEVICE FOR SORTING COMESTIBLES
Filed Oct. 22, 1948 13 Sheets-Sheet 3

Inventor
DELBERT J. WARD
By Lyon & Lyon
Attorneys

Dec. 30, 1952 D. J. WARD 2,623,635
DEVICE FOR SORTING COMESTIBLES
Filed Oct. 22, 1948 13 Sheets-Sheet 4

Inventor
DELBERT J. WARD
By Lyon & Lyon
Attorneys

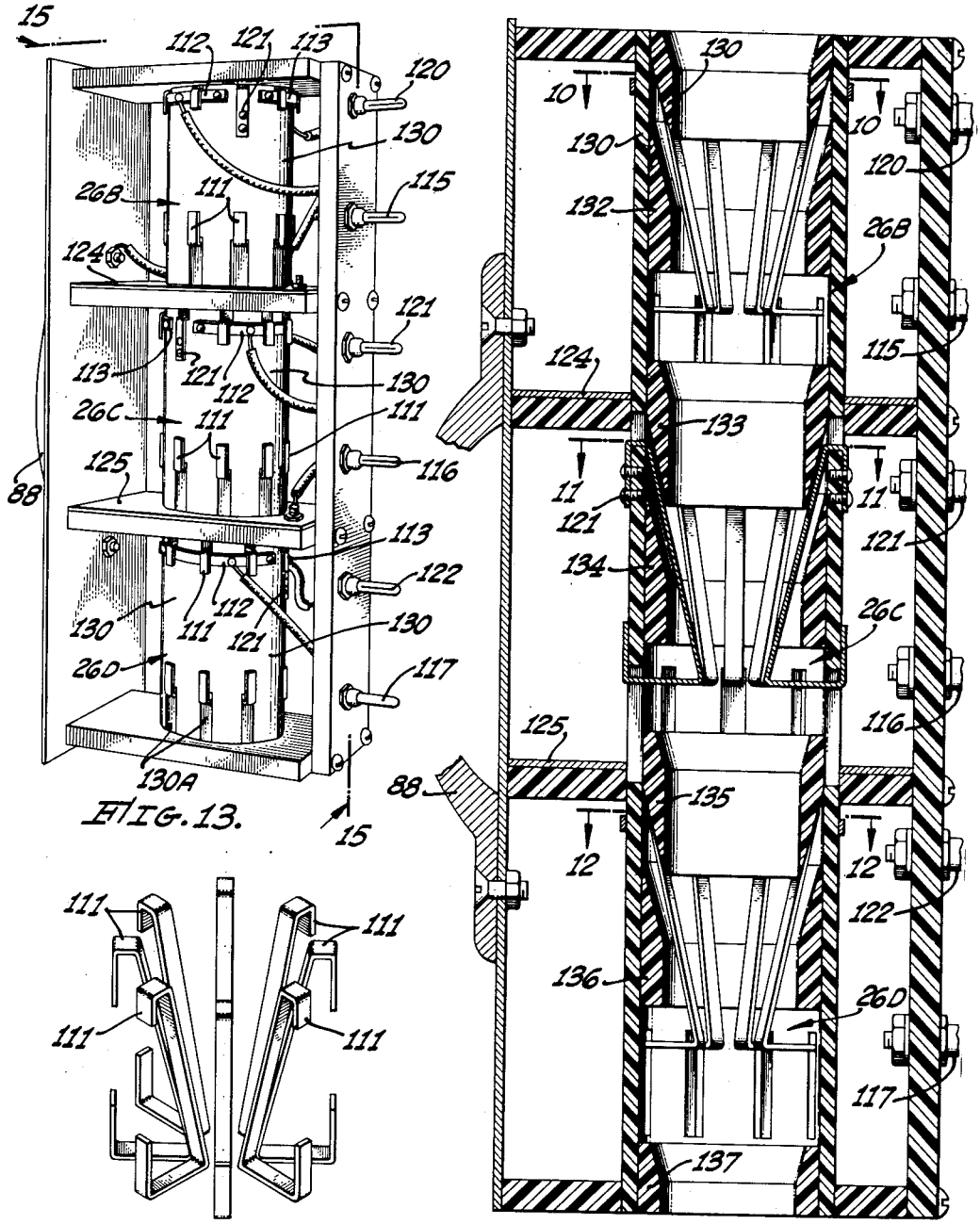

Dec. 30, 1952   D. J. WARD   2,623,635
DEVICE FOR SORTING COMESTIBLES
Filed Oct. 22, 1948   13 Sheets-Sheet 7

Inventor
DELBERT J. WARD
By Lyon & Lyon
Attorneys

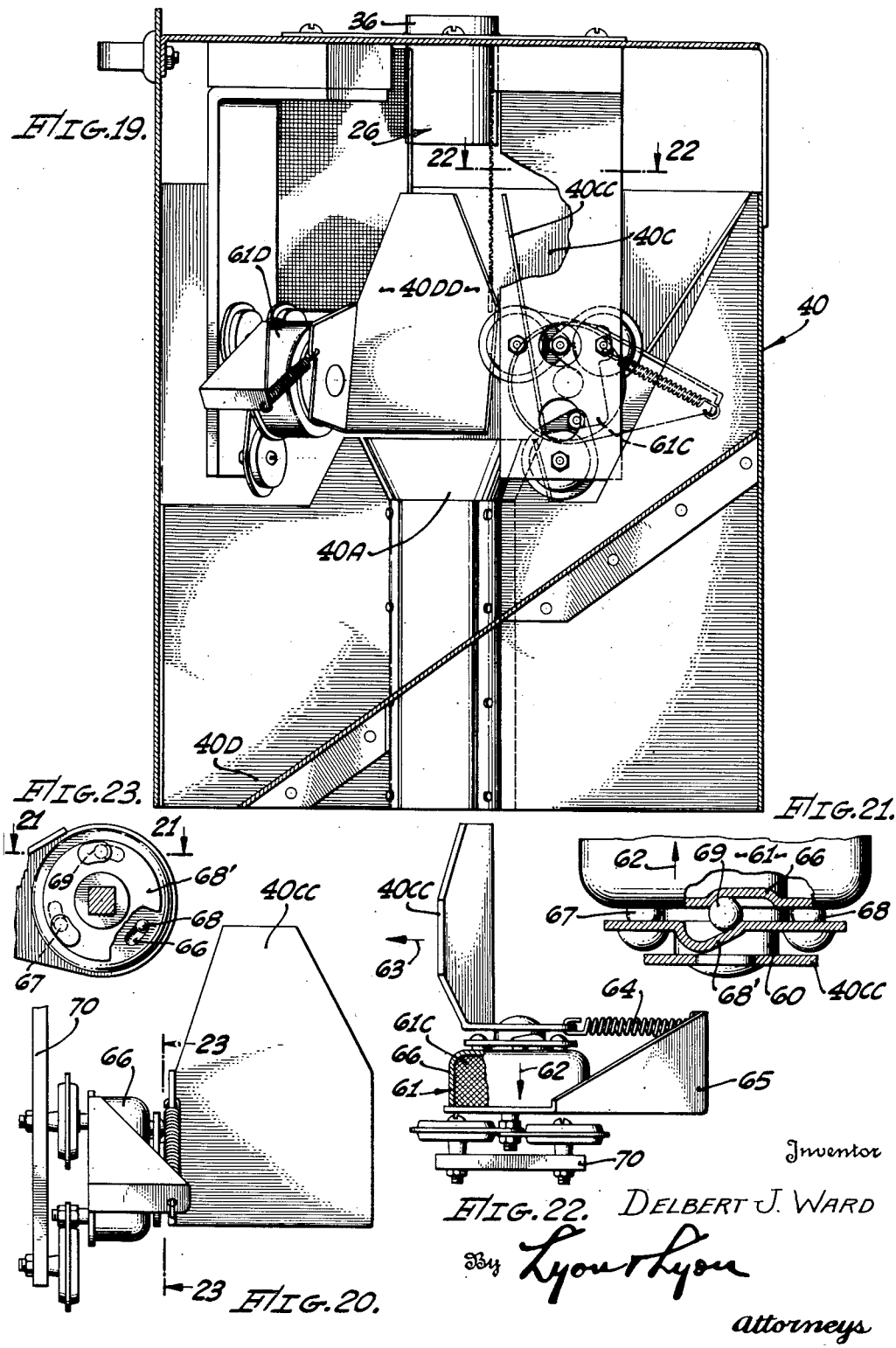

Dec. 30, 1952 D. J. WARD 2,623,635
DEVICE FOR SORTING COMESTIBLES
Filed Oct. 22, 1948 13 Sheets-Sheet 9

Inventor
DELBERT J. WARD
By Lyon & Lyon
attorneys

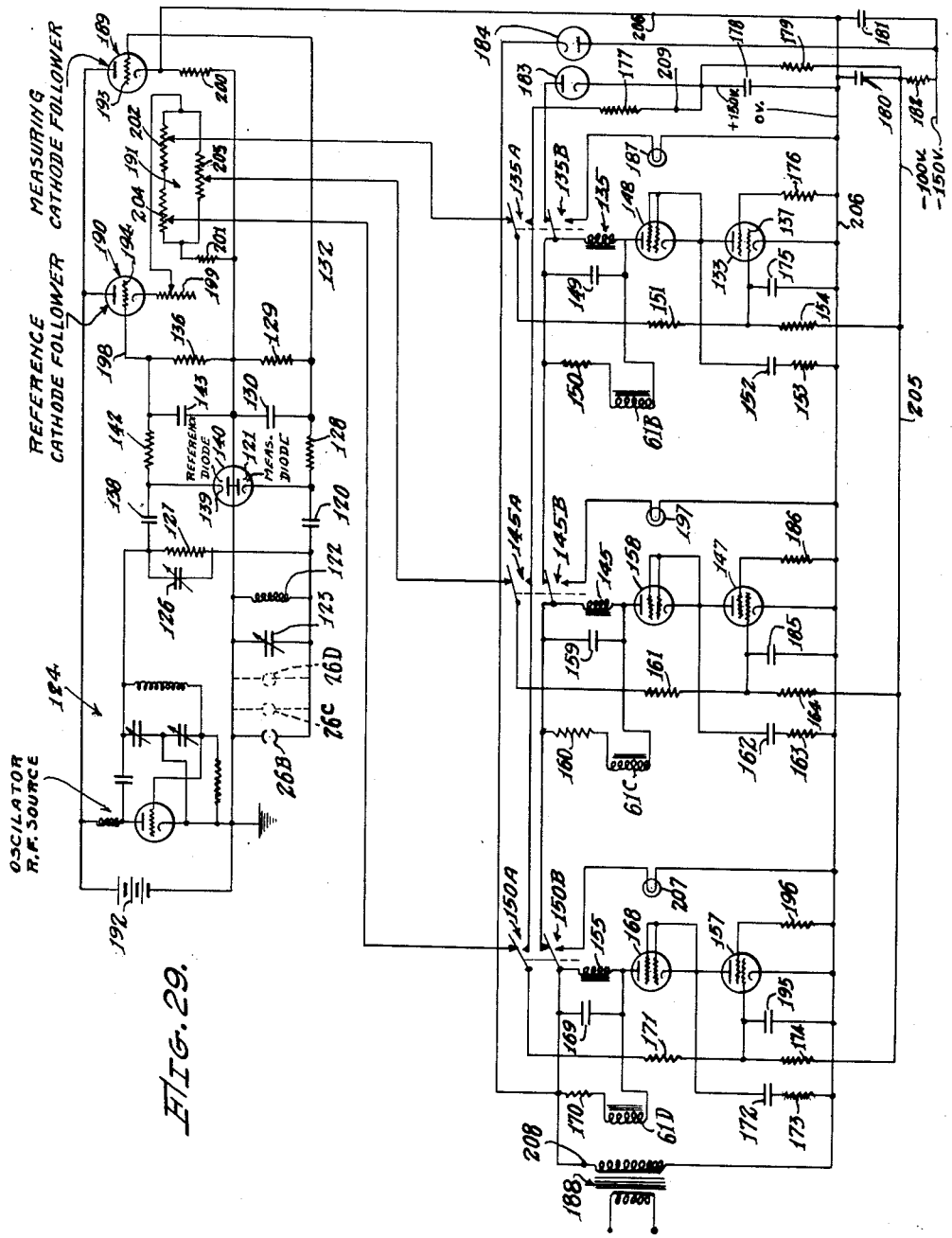

Dec. 30, 1952          D. J. WARD          2,623,635

DEVICE FOR SORTING COMESTIBLES

Filed Oct. 22, 1948          13 Sheets—Sheet 11

INVENTOR.
DELBERT J. WARD
BY Lyon & Lyon
ATTORNEYS

Dec. 30, 1952  D. J. WARD  2,623,635
DEVICE FOR SORTING COMESTIBLES
Filed Oct. 22, 1948  13 Sheets-Sheet 12
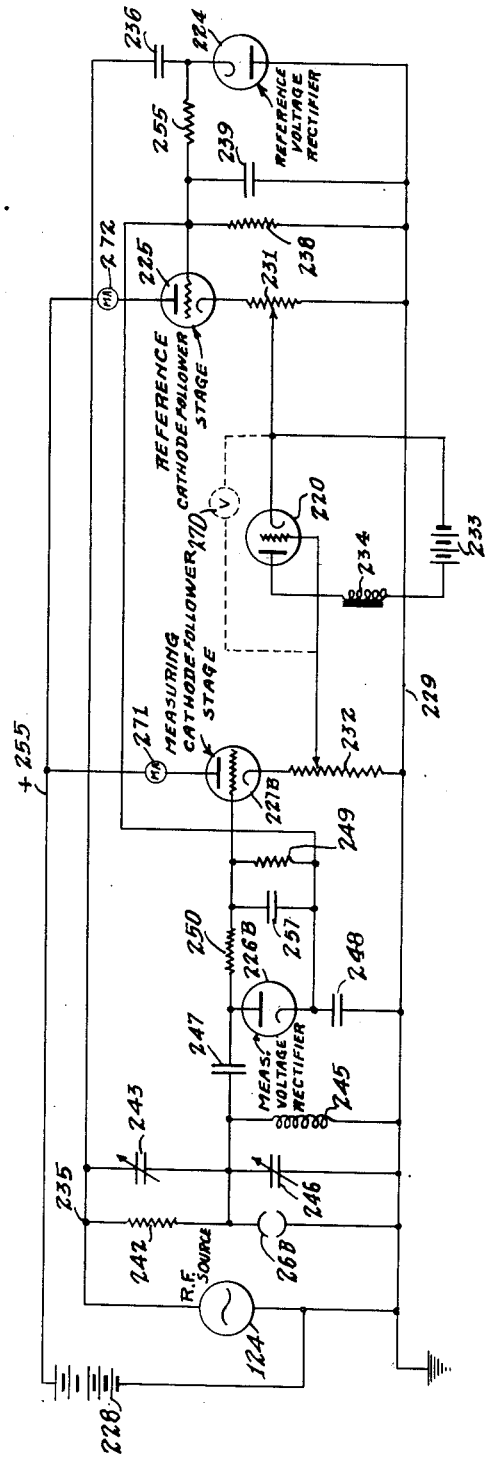
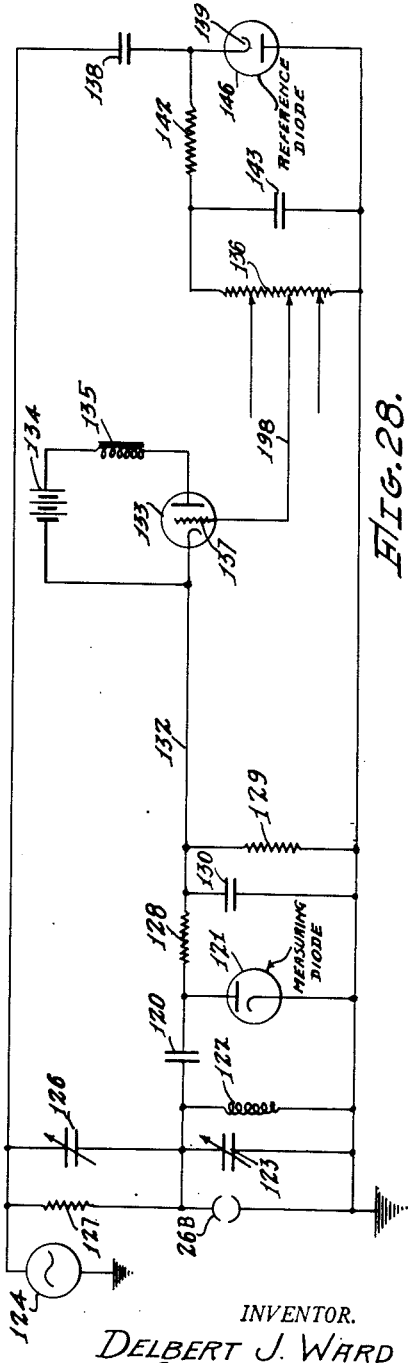
INVENTOR.
DELBERT J. WARD
BY Lyon & Lyon
ATTORNEYS Dec. 30, 1952 D. J. WARD 2,623,635
DEVICE FOR SORTING COMESTIBLES
Filed Oct. 22, 1948 13 Sheets-Sheet 13

Inventor
DELBERT J. WARD
By Lyon & Lyon
Attorneys

Patented Dec. 30, 1952

2,623,635

UNITED STATES PATENT OFFICE 2,623,635

DEVICE FOR SORTING COMESTIBLES

Delbert J. Ward, Sherman Oaks, Calif.

Application October 22, 1948, Serial No. 55,936

16 Claims. (Cl. 209—81)

The present invention relates to an improved device for sorting or grading of comestibles such as dates, fruits, nuts and the like, according to the internal moisture content of the comestible, the device shown and claimed herein being specifically applicable to the sorting and grading of dates.

In accordance with the present invention, dates are fed individually through a high frequency measuring circuit and sorted and graded according to the relative moisture content, the moisture content of a particular date being effective to influence appreciably in varying degrees the high frequency current or voltage in a high frequency measuring circuit. While certain principles of the present invention may be applied in high frequency measuring circuits in which a date passes through only one electrode arrangement, preferably, in accordance with the present invention, a date is successively passed through a plurality of electrode arrangements and the associated apparatus is operated in accordance with a plurality of determinations obtained in different electrode structures oriented differently with respect to the same date for increased accuracy and dependability.

In the distribution of dates, it is very desirable to know the moisture content of each individual date whereby the dates may suitably be processed and offered to the public in the best possible condition. In the event that the moisture content of the date is too low, moisture may be added thereto in accordance with well known processes and, conversely, if the moisture content of the date is too high, it may be dehydrated in varying degrees. For ease and efficiency in handling, it is desirable that batches of dates of the same moisture content, of course, be treated in the same way. In order to achieve this condition, it is initially necessary to sort or grade dates according to their moisture content. The present apparatus serves this purpose, namely, of grading and sorting dates in accordance with its moisture content.

An object of the present invention is to provide an improved comestible sorting and grading apparatus operated in accordance with the moisture content of the comestible, the apparatus being characterized by its automatic operation and accuracy with which the desired results are obtained.

Yet another object of the present invention is to provide an improved comestible sorting and grading apparatus which, in accordance with important features of the present invention, embodies a novel electrode arrangement wherein a comestible is subjected to three different determinations in its passage through the apparatus.

Still another object of the present invention is to provide an improved sorting and grading apparatus characterized by the accuracy with which the individual comestibles are sorted or graded.

Yet another object of the present invention is to provide an improved sorting and grading apparatus which includes as its feature determination of the moisture content of comestibles using high frequency currents.

Yet another object of the present invention is to provide an improved comestible sorting and grading apparatus which incorporates novel high frequency control apparatus for achieving the above indicated results.

Yet another object of the present invention is to provide an improved high frequency comestible sorting and grading apparatus incorporating as features thereof a novel electrode arrangement within which moisture determinations are made and averaged as the comestible passes therethrough.

Still another object of the present invention is to provide an improved sorting and grading apparatus in which moisture content of comestibles may be determined substantially independently of electrode contact resistance and without piercing the comestible.

Yet another object of the present invention is to provide an improved high frequency sorting or grading apparatus characterized by the fact that it incorporates a novel compensating circuit arranged to make moisture determinations substantially independently of the voltage of the high frequency source or variations in such voltage.

Still a further object of the present invention is to provide an improved electrical responsive sorting and grading apparatus characterized by the fact that the apparatus is ultimately actuated in accordance with a plurality of measurements of moisture content taken in different directions through the comestible.

Yet a further object of the present invention is to provide an improved electrical responsive sorting and grading apparatus which incorporates a compensatory circuit arranged to render moisture determinations substantially independently of voltage of its high frequency source and characterized further by the fact that the apparatus is ultimately operated in accordance with the average of a plurality of different determinations made on the same comestible.

Still a further object of the present invention is to provide an improved sorting and grading apparatus in which the structural elements thereof are arranged in a novel manner for convenience of assembly, servicing and maintenance.

Yet a further object of the present invention is to provide an improved sorting and grading apparatus characterized by its simplicity and compactness.

Still a further object of the present invention is to provide an improved comestible measuring and sorting apparatus characterized by the fact that it is operated in accordance with the average value of a plurality of impedance measurements made thereon.

Yet a further object of the present invention is to provide an improved date sorting and grading apparatus through which dates of widely varying moisture content may be run and automatically separated or stored in accordance with different degrees of moisture content.

Another object of the present invention is to provide an improved electrode system arranged for use in a high frequency circuit for determining electrical characteristics of comestibles passing therethrough, a subsidiary feature being that capacity changes resulting from such electrodes moving in accordance with varying-sized comestibles are substantially eliminated so that the ultimate determination is substantially independent of the size of the comestible.

Another object of the present invention is to provide an improved fully automatic multiple high frequency sorting or grading apparatus arranged so that a single radio frequency power supply furnishes the power simultaneously for a plurality of measuring systems.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2 is a view in side elevation thereof taken substantially on the line 2—2 of Figure 1.

Figures 3, 4 and 5 show in greater detail some of the apparatus shown in Figure 2.

Figure 13 is a perspective view of the plug-in electrode structure shown in Figure 9.

Figure 14 is a perspective view of the electrode fingers in each one of the three electrode arrangements shown in Figures 13 and 15.

Figure 15 is a longitudinal sectional view taken substantially as indicated by the line 15—15 in Figure 13.

Figure 19 is a sectional view taken substantially on the line 19—19 of Figure 16.

Figure 20 is a view taken substantially in the direction indicated by the lines 20—20 in Figure 16.

Figure 21 is a sectional view taken substantially on the line 21—21 of Figure 23.

Figure 22 is a view taken substantially in the direction indicated by the lines 22—22 in Figure 19.

Figure 23 is a view taken substantially in the direction indicated by the lines 23—23 in Figure 20.

Figure 28 is an electric circuit diagram for illustrating some of the principles used in the operation of my electric apparatus embodying the features of the present invention, shown in greater detail in Figure 29.

Figure 29 is an electric circuit diagram of apparatus embodying the present invention.

Figure 31 is an electric circuit diagram for illustrating some of the principles used in the operation of the apparatus shown in Figure 30.

Figure 1:
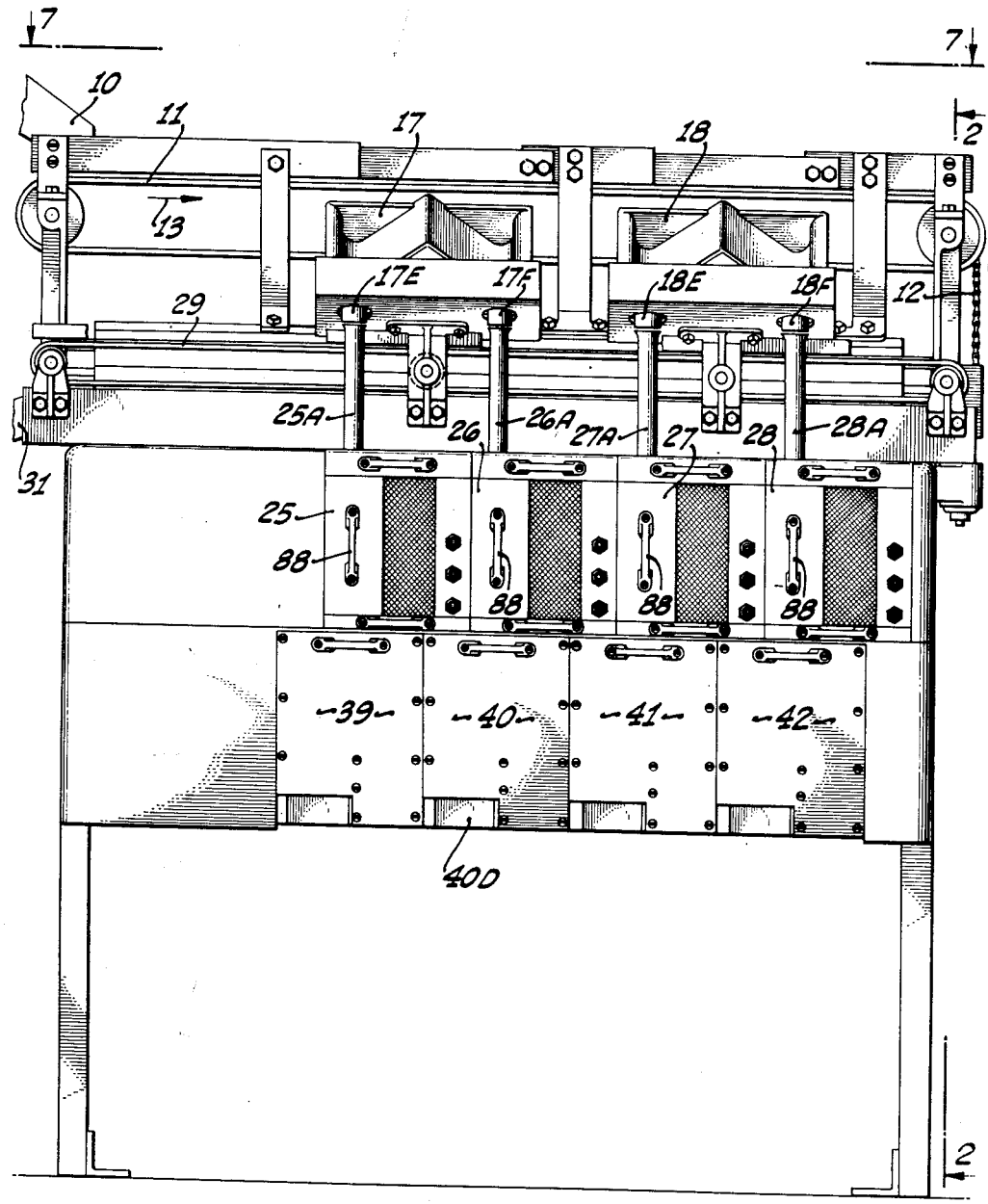
Figure 1 is a view in front elevation of a portion of the apparatus embodying the present invention.
Figure 7:
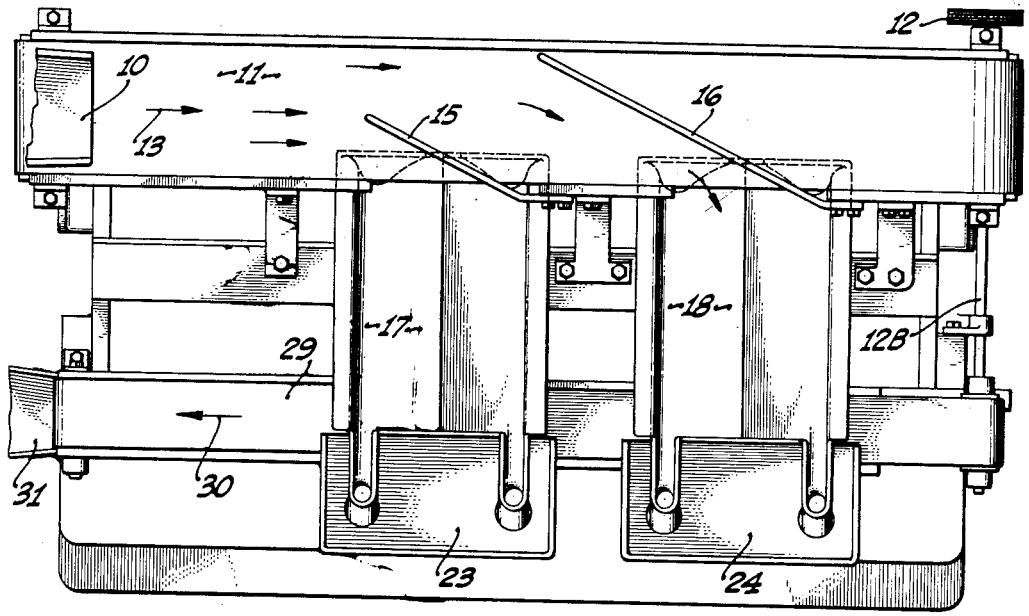
Figure 7 is a top plan view taken as indicated by the line 7—7 of Figure 1.

In accordance with the present invention, dates are fed in regulated amounts from a chute 10 (Figures 1 and 2) onto a horizontally extending endless belt 11 which is continuously moved by the motor driven chain 12 in the direction indicated by the arrow 13 in Figures 1 and 7 to positions adjacent to the stationary angularly positioned deflecting members 15 and 16, the first deflecting member 15 extending over approximately one-half the width of the endless belt 11 to thereby deflect approximately one-half of the dates carried on belt 11 onto the vibratory aligned chute or pan 17, while the other deflecting member 16 extends the full width of the belt 11 to deflect the remaining dates on belt 11 into the other vibratory aligning pan 18.

The vibratory pans 17, 18, best shown in Figures 3 and 5, are mounted on individual mechanical vibrating units 17A, 18A respectively, which in turn are resiliently mounted through corresponding springs 17B, 18B on the stationary support 22. These pans 17, 18, with the dates thus loaded therein, are vibrated to cause substantially one-half of the dates in such pans to travel in single file, under the action of gravity forces, down the integrally formed corresponding channels or chute members 17E, 17F, 18E, 18F from where they may drop into the aligned spaced vertical tubes 25A, 26A, 27A and 28A respectively.

Thus, the date distributing mechanism described hereinabove serves to divide and cause one-fourth of the dates each to flow into the corresponding aligned tubes 25A, 26A, 27A and 28A and to pass such dates in single file to an individual independent measuring electrode system incorporated in the detachable housings 25, 26, 27 and 28.

In the event that the dates become crowded in the guide channel or chute members 17E, 17F, 18E and 18F, so that they do not follow in single file, the ends of such channels, being tubular and disposed adjacent the stationarily mounted deflecting trays 23 and 24, cause the excess dates, not passable through such tubular portion, to contact the respective trays 23, 24 and slide therefrom under the influence of gravity onto the continuously moving horizontally disposed endless belt 29 which is driven by the same motor-operated chain 12, through shaft 12B (Figure 7), to move the dates in the direction indicated by the arrow 30 so as to allow them to fall into the discharge chute 31.

The units 25, 26, 27 and 28 are each exactly the same so that a description of unit 26 suffices to describe the other units 25, 27 and 28.

The unit 26 includes an electrode system best seen in Figures 9-15. Briefly, such electrode system incorporates three differently oriented condensers 26B, 26C and 26D through which dates are fed successively, in that order, in single file, after which they pass through the aligned guide tubes 35 and 36 respectively in units 26 and 40.

Figure 26:
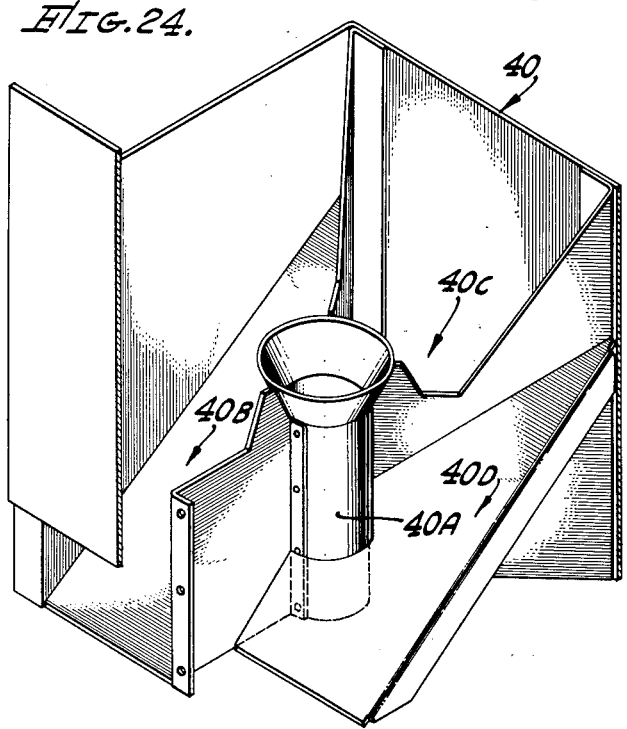
Figure 26 is a perspective view of the apparatus shown in Figure 24.
Figure 27:
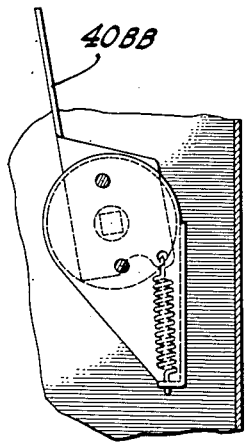
Figure 27 is a view taken substantially in the direction indicated by the lines 27—27 in Figure 16.

The unit 40 underlies the unit 26 and its construction is typical of the other units 39, 41 and 42 (Figure 1) which underlie the units 25, 27 and 28. A description of device 40 serves, therefore, as a sufficient description of devices 39, 41 and 42. A date passing through unit 26 continues in its vertical downward motion through the aligned tube 40A in unit 40 in the event that such date has a moisture content less than a predetermined moisture content. In the event that the date has a moisture content greater than such predetermined moisture content, the date is automatically delivered to one of the three chutes 40B, 40C or 40D (Figure 26), depending upon the degree to which its moisture differs from such predetermined amount.

Figure 16:
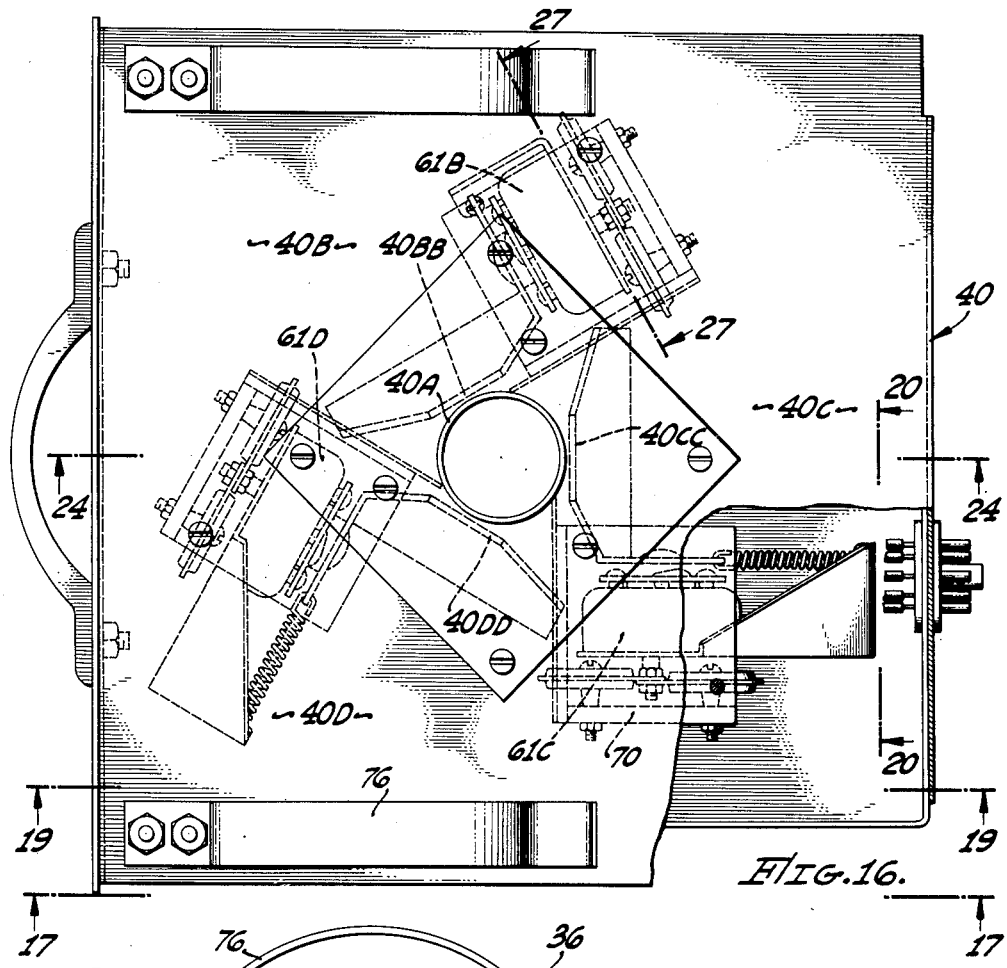
Figure 16 is a view taken substantially in the direction indicated by the line 16—16 of Figure 9.
Figure 17:
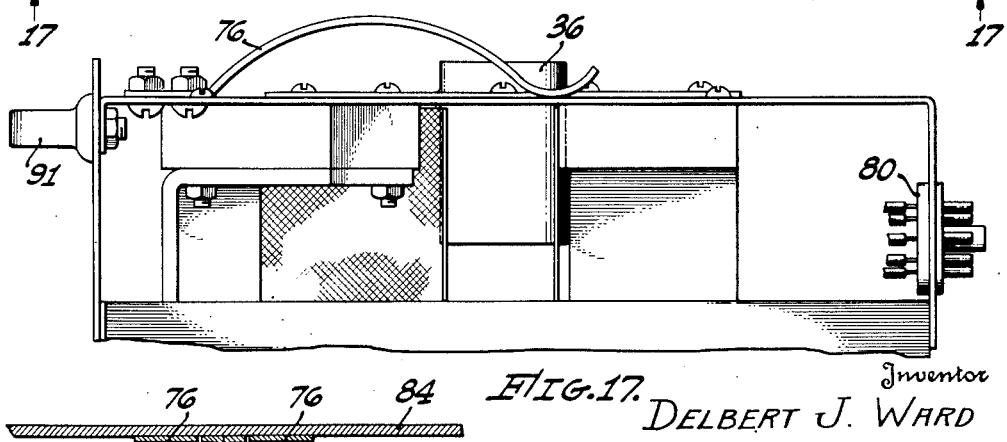
Figure 17 is a view taken substantially as indicated by the line 17—17 in Figure 16.
Figure 18:
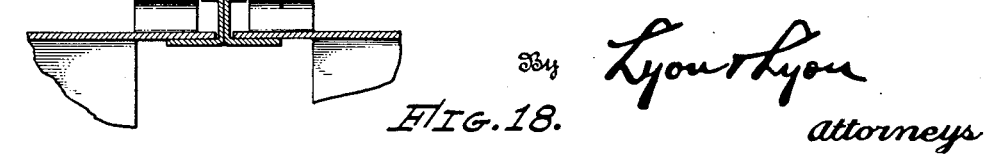
Figure 18 is a sectional view taken substantially on the lines 18—18 in Figure 9.
Figure 24:
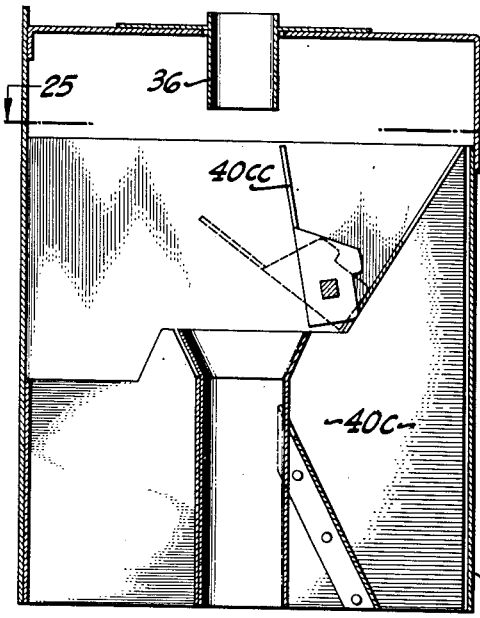
Figure 24 is a view taken substantially as indicated by the lines 24—24 in Figures 16 and 25.
Figure 25:
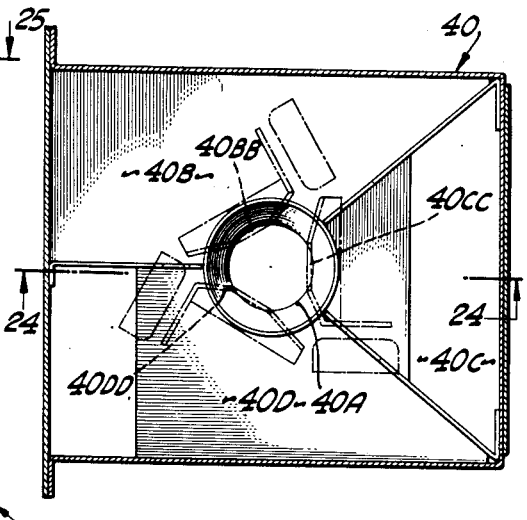
Figure 25 is a view taken substantially in the direction indicated by the lines 25—25 in Figure 24.

Thus, a date passing from unit 26 may pass either through the central tube 40A or down through chute 40B, 40C or 40D. In the latter three cases, the date is deflected by the corresponding solenoid actuated deflector plates 40BB, 40CC and 40DD (Figure 16) and passes through either chute 40B, 40C or 40D into a corresponding receptacle or onto an endless belt (not shown). These deflector plates 40BB, 40CC, and 40DD are operated, as described more fully hereinafter, in accordance with the moisture content of the date.

The deflector plates 40BB, 40CC, and 40DD are each actuated by a similar mechanism so that a description of the solenoid actuated mechanism associated with the deflector plate 40CC, shown in detail in Figures 19, 20, 21, 22, and 23, suffices to describe the similar mechanism associated with the other deflector plates.

Referring to the previously mentioned figures, the deflector plate 40CC is attached to the core member 60 associated with the solenoid 61, the core member 60 being moved in the direction indicated by the arrow 62 in Figures 21 and 22 to produce rotative movement of the deflector plate 40CC in the direction indicated by the arrow 63. Such rotative movement of the deflector plate 40CC is about the axis of the cylindrical core member 60. Normally, when the solenoid 61 is de-energized, the deflector plate 40CC assumes the position shown in Figures 20-23 inclusive, the deflector plate being urged in the position shown by the coil tension spring 64 having one of its ends affixed to the deflector plate 40CC and the other one of its ends attached to the bracket member 65 mounted stationarily with respect to the casing 66 of the solenoid 61.

In order to produce rotative movement of the deflector plate 40CC upon energization of the solenoid 61, there are provided three balls 67, 68, 69, equally spaced on a circle, the balls being disposed between re-entrant or depressed portions of the solenoid housing 66 and between the correspondingly spaced depressed cam portions in the cam plate 68 which is attached to the core member 60 for movement therewith, it being noted that the core member 60, cam plate 68, and deflector plate 40CC are thus mounted as a unit.

Thus, when the core member 60 moves in the direction indicated by the arrow 62 in Figure 21, when the solenoid 61 is energized, the balls 67, 68, and 69, cooperating with the depressed portions in the casing 66 and cam plate 68, cause the deflector plate 40CC to rotate against the action of the tension spring 64. Such rotative movement of the deflector plate 40CC continues until the upper end thereof, in Figure 19, is disposed underneath the exit end of the tube 36 to thereby block the flow of dates from tube 36 into the central tube 48 and to thereby cause the dates to be deflected into the chute 40C.

The particular circuit arrangement whereby the solenoid 61 is energized is described in detail hereinafter, as is also the circuit associated for energizing the solenoid associated with the other deflector plates 40BB and 40DD. The solenoid casing 66 is stationarily mounted with respect to the stationary bracket member 70 on the unit 40.

Figure 8:
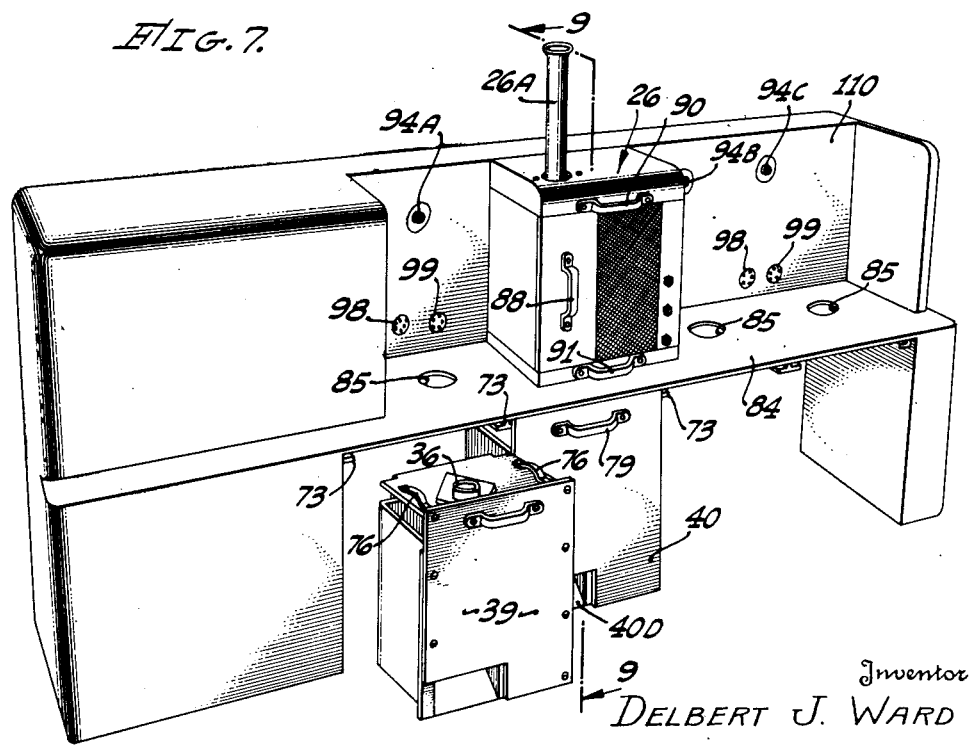
Figure 8 is a perspective view of a portion of the apparatus shown in Figure 1 with some of the removable elements omitted to show the structural figures.
Figure 9:
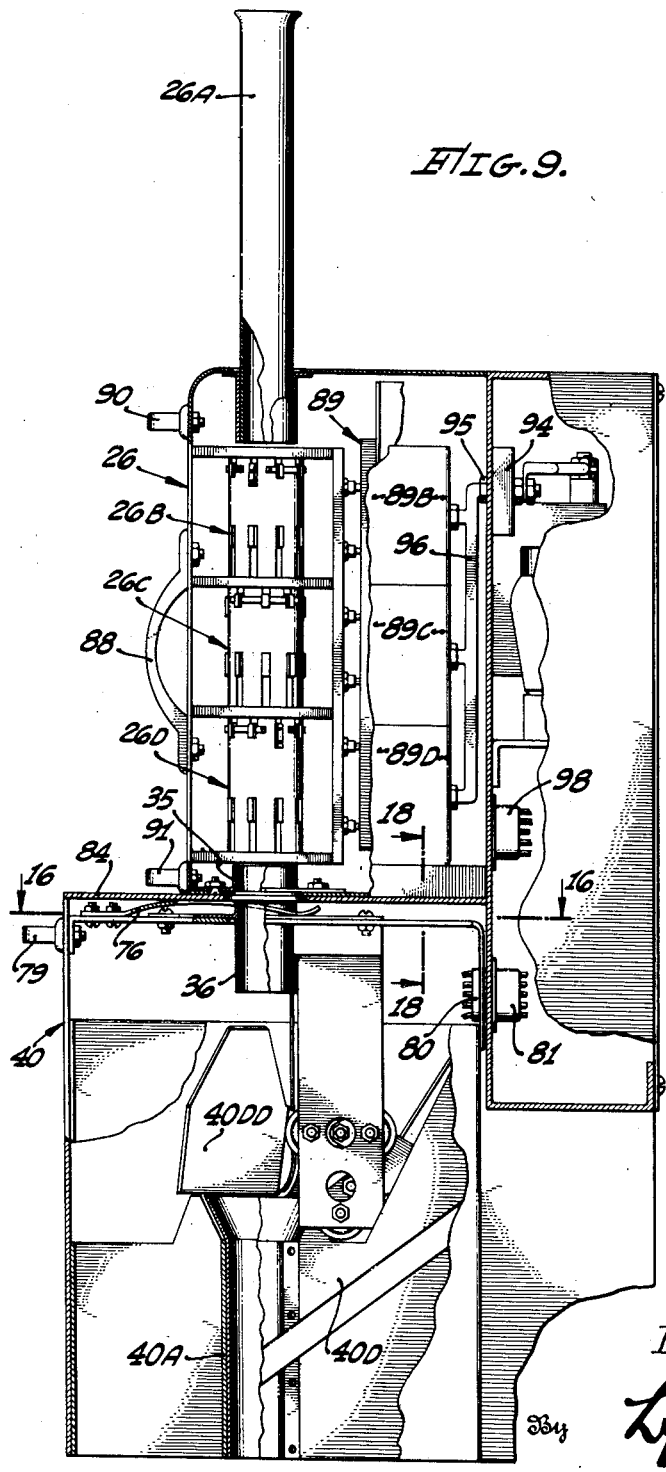
Figure 9 is a sectional view taken substantially on the line 9—9 of Figure 8.
Figure 10:
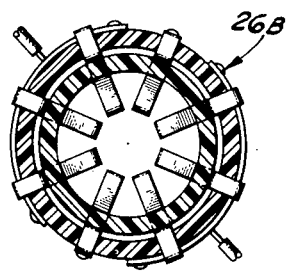
Figures 10, 11 and 12 are sectional views taken substantially on corresponding lines in Figure 15.
Figure 11:
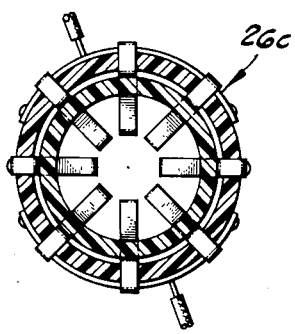
Figure 12:
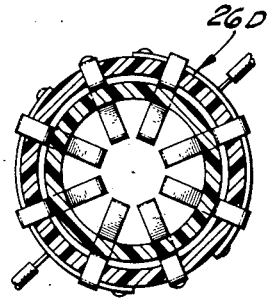

The unit 40, itself, may be supported on the upper L or T-shaped guide members 73, 73 (Figure 8) within which they are releasably and firmly held by a pair of bow-leaf springs 76 (Figure 9). For convenience, a handle 79 is provided on the outer front surface of the unit 40 to facilitate its movement into and out of position. When the unit 40 is moved into its operable position, shown in Figure 9, electric circuit connections are automatically made through the cooperating male and female plug arrangements 80, 81, such cooperating plugs serve to conduct current to the solenoids associated with the deflector plates 40BB, 40CC, and 40DD. In such operable position, the spring 76 is resiliently pressed against the bottom surface of the stationary shelf member 84 which is arranged to support the units 25, 26, 27 and 28, and which is provided with apertures 85 to allow dates to pass therethrough.

The units 25, 26, 27, and 28 are likewise plug-in units, normally supported on the shelf member 84, and are each provided with a handle 88 to facilitate handling. The unit 26 itself comprises essentially two substructures, first, the substructure shown in detail particularly in Figures 13, 14, and 15, and the cooperating substructure 89 (Figure 9), comprising the so-called R. F. cells 89B, 89C, and 89D, into which respectively the banana-type terminals, shown in Figure 13 and associated with the condenser structures 26B, 26C, and 26D are adapted to be plugged in respectively. The particular circuit element within one of the R. F. cells 89B, 89C, and 89D is shown in schematic form in the blocked rectangles in Figure 30. Thus, these R. F. cells 89B, 89C, and 89D are quickly attachably and detachably connected to the terminals of the electrode structures 26B, 26C, and 26D which are mounted as a unit with its handle member 88. The unit 26, as a whole, may be moved with its handles 90 and 91 (Figure 8). When the unit 26 is moved to the left, in Figure 9, as for example, by pulling on the handles 90 and 91, the condenser structure 26B, 26C, and 26D and also the R. F. cells 89B, 89C, and 89D move to the left as a unit, the R. F. cells 89B, 89C, and 89D being mounted on the casing of the unit 26 and being quickly attachable and detachable to the high frequency voltage terminal 94 through plug 95. The high frequency conductor 96, interconnecting the R. F. cells 89B, 89C, and 89D, is a rigid member, is as short as possible, and is electrostatically shielded from the circuit elements in the R. F. cells and from the associated condenser structures.

Figure 6:
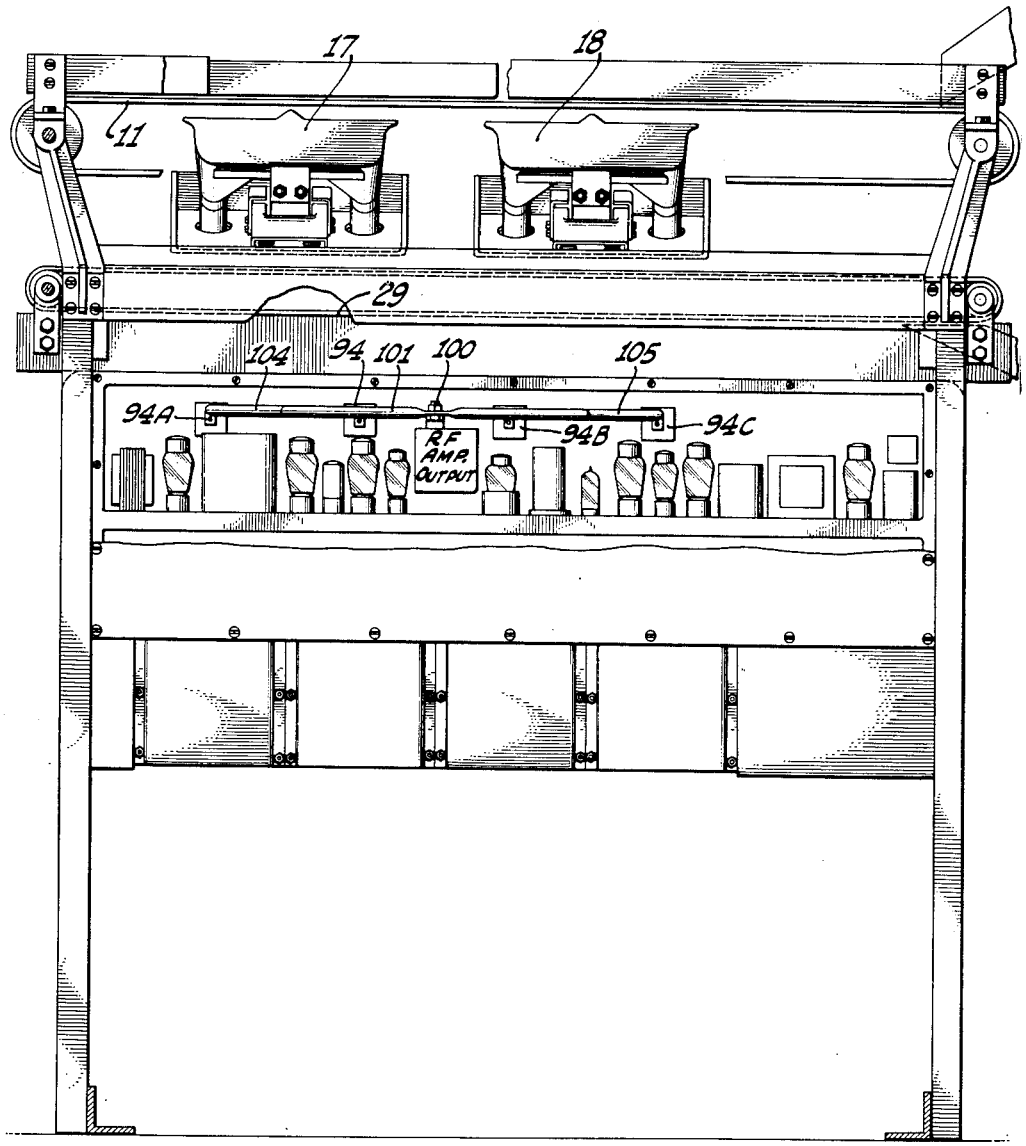
Figure 6 is a sectional view taken substantially as indicated on the line 6—6 of Figure 2.
Figure 35:
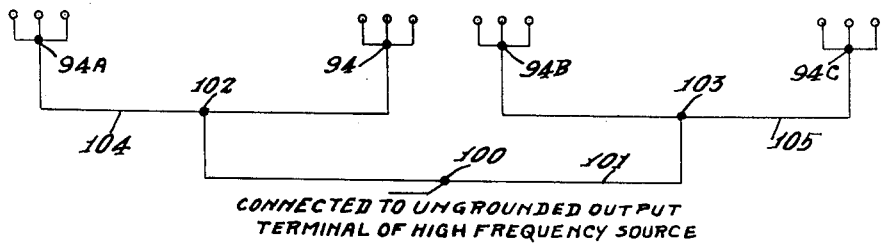
Figure 35 illustrates the manner in which the output terminal of the high frequency voltage source is connected to four measuring channels, each of which comprises three electrode structures.

Preferably, as described hereinabove, the electrode structures 26B, 26C, and 26D are detachable as a unit from the composite unit 26 to allow, for example, cleaning of the condenser structures and to effect removal of a date if, for example, one should stick in the condenser. Also, to effect other circuit connections to the circuit components in the R. F. cells 89B, 89C, and 89D, there is provided a pair of cooperating plug and socket elements 98, 99 for each one of the units 25, 26, 27, and 28 so that all necessary circuit connections are automatically made when the units 25, 26, 27, and 28 are placed in proper supporting position on the shelf member 84. The high frequency voltage connections to the R. F. cells in each one of the units 25, 26, 27, and 28 are somewhat critical and are accomplished by the circuit arrangements, illustrated in Figures 6 and 35 wherein the corresponding terminals have identical reference numerals. Such high frequency voltage is generated electrically and amplified in an R. F. amplifier whose ungrounded output terminal is represented at 100. This terminal 100 is connected to the midpoint of a structure 101 whose ends are connected to the midpoints 102, 103 respectively, of the conductors 104 and 105. Opposite ends of lead 104 are connected respectively to terminals 94A, 94. Opposite terminals of conductor 105 are connected to terminals 94B and 94C. The terminals 94A, 94, 94B, and 94C are shown in Figures 6 and 8 and comprise the terminal to which corresponding R. F. cells in the various units 25, 26, 27, and 28 are releasably connected. Preferably, the leads 101, 104, and 105 are as short as possible, of equal length and symmetrically disposed, as shown in Figures 6 and 35. These leads 101, 104, 105 are preferably shielded from the electrical elements in the units 25, 26, 27, and 28 as, for example, by the metal back plate 110 upon which the various connectors are mounted.

The electrode structure associated with each one of the units 25, 26, 27, and 28 is shown in detail in Figures 9, 10, 11, 12, 13, 14, and 15, and is described immediately below.

The three electrode or condenser structures 26B, 26C, 26D each comprise eight resilient fingers 111, disposed as shown in Figure 14. Three of such fingers are interconnected by a metal bonding strip 112 to form one "plate" of the condenser while three other fingers 111 are bonded together by a metallic connecter 113 to form the other "plate" of the condenser. The other two fingers of the eight fingers are diametrically disposed on the central insulating supporting tube 130 and are connected thereto at their upper ends by fasteners 121. These two diametrically disposed fingers remain "dead" and are not connected to other circuit elements. One plate of such condensers 26B, 26C, and 26D, thus formed by the use of the metallic connector 112, are connected respectively to the terminals 115, 116, and 117 which, in use, are at ground potential. The other plates of the condensers 26B, 26C, and 26D, formed by the use of the connector 113, are connected respectively to the terminals 120, 121, and 122. The electrical shielding plates 124 and 125 are likewise connected to the grounded terminals 115 and 116 respectively. The relative disposition of the bonding connectors 112 and 113 is of importance, and as shown in Figure 13, such connectors are "staggered" in the various condenser sections 26B, 26C and 26D to assure the taking of measurements on a single date in differently oriented directions, it being noted that a date may occupy, at one particular time, only one of the condenser structures 26B, 26C, or 26D, and that in passing successively through these condenser structures, the date moves in its longitudinal direction with substantially no rotation about such longitudinal axis.

Preferably, the bonding strips 112, 113, in each individual condenser 26B, 26C, or 26D, are so arranged that effective measurements are taken through the date in three directions spaced 60° apart.

In greater detail, as shown in Figures 14 and 15, the resilient spring electrode members 111 are hooked at their upper ends and pass through suitable apertures in the insulating tube 130 for support thereon while the bottom ends of such resilient fingers 111 extend gradually inwardly and are bent to form guide members with the apertures 130A in the tube 130 through which they pass. The two fingers 111 not used in the condenser structure are fastened at their upper ends to the tube 130 while the remaining fingers are secured one-half to the bonding strip 112 and the other half to the bonding strip 113 by soldering, welding, and the like, such bonding strips 112, 113 being maintained stationary on the tube 130 by, for example, rivets. It is noted that the bottom end of each one of such fingers is free to move radially with respect to the enclosing tube 130 and that their bent ends provide a guide member, and also their upturned ends serve as stop members incorporated with the outer surface of the tube 130 against which they are resiliently pressed due to the inherent resiliency of such fingers. As a date passes through, for example, electrode structure 26B, the bottom ends of the fingers are pressed outwardly by the action of gravity forces on the date to assure a uniform and predetermined electrical contact with the date. In order to assure central movement of the date through the tube 130, there is preferably provided the spaced guide members 131, 132, 133, 134, 135, 136, and 137, each of insulated material and affixed within the tube 130. These insulating guide members 132, 134, and 136 serve also as stop members for extended movement of the fingers 111 to redistribute stresses on the various fingers in the event that a date tends to move through the electrode structures non-centrally with respect to the axis of the tube 130.

Figure 29 shows in schematic form a circuit arrangement embodying features of the present invention and utilizing the apparatus described. The circuit shown in Figure 29 does not include an averaging arrangement as does the circuit shown in Figure 30, and only one of the electrode or condenser structures 26B in the three electrode arrangements shown in Figure 9 is utilized in making measurements or determinations. The principle of operation of the circuit shown in Figure 29 is embodied in the simplified circuit arrangement shown in Figure 28.

In Figure 28, the electrode or condenser structure 26B, between which dates are successively passed, has one of its terminals grounded and the other one of its terminals connected through a condenser 120 to the anode of the measuring rectifier device 121 having its cathode grounded. Also, the terminals of the condenser structure 26B are connected in parallel to the tuned circuit comprising the inductance 122 and variable condenser 123.

An RF voltage from source 124 is applied across the terminals of the condenser 26B, the magnitude of the voltage across such condenser being adjustable by the adjustable serially connected condenser 126 having the resistance 127 connected in parallel therewith. Serially connected resistances 128 and 129 are connected between the anode and cathode of the device 121 and thus resistance 129 serves as a load circuit for the rectified output of the measuring diode rectifier 121. The resistance 128 and condenser 130, connected across opposite terminals of resistance 129, serve as a filter network to produce a filtered rectified voltage output across the terminals of resistance 129 in accordance with the dryness or wetness of the date in the electrode structure 26B. The greater the degree of wetness or moisture content in the date, the less positive becomes the lead 132, which is connected to the junction point of resistance 128 and 129 and is also connected to the cathode of the thyratron tube 133. The tube 133 is always in condition for firing because of the unidirectional voltage source 134, serially connected with the relay winding across the cathode and anode of the device 133.

The control grid 137 of the thyratron tube is connected to an adjustable tap on the potentiometer resistance 136 which has a reference voltage applied across its outside terminals. Such reference voltage is proportional to the magnitude of the voltage from the RF source 124 and is unidirectional in character. Such unidirectional voltage is produced by connecting the ungrounded terminal of source 124 through condenser 138 to the cathode 139 of the reference diode rectifier 140, the anode of the diode 140 being grounded.

Resistances 142 and 136 are serially connected across the terminals of the diode and the resistance 142 together with the condenser 143, connected in parallel with the resistance 136, serve as filter elements.

The voltage thus applied to the control grid 137 is substantially constant but varies with changes in magnitude of the RF voltage from source 124, and in operation of the device, the potential of the cathode of device 133 is altered with respect to the potential of the grid 137 to fire the thyratron tube 133.

An important feature of the arrangement described in Figure 28 is that the net voltage between the cathode and control grid of the device 133 is substantially independent of the magnitude of the R. F. voltage. The operation of the thyratron tube 133 is thus substantially independent of variations of the voltage of the R. F. source, and once it is fired, the current flow therethrough produced by the source 134, causes the relay winding 135 to be energized and the associated relay switches to be actuated to effect a control operation as described in greater detail hereinafter.

The circuit shown in Figure 28 is a simplified version of the circuit used, shown in Figure 29, wherein corresponding parts have identical references. It is noted that, in comparing Figures 28 and 29, a cathode follower circuit 189 is interposed in Figure 29, on the one hand, between lead 132 and the cathode of thyratron device 133, and, on the other hand, a cathode follower circuit 190 is interposed between the control grid 137 of device 133 and the variable tap on potentiometer resistance 191 through serially connected resistance 131 and switch 135B.

The anodes of the cathode follower stages 189 and 190 are connected to the positive terminal of voltage source 192, and their control grids 193 and 194 connect respectively to lead 132 and 195. The cathode of the reference cathode follower stage 190 is connected to one terminal of the voltage dividing circuit 191 through the adjustable resistance 199, and the cathode of stage 189 is connected to the other terminal of the voltage dividing circuit 191 through the serially connected resistances 200 and 201 whose junction point is connected to the junction point of resistances 129 and 136. The voltage dividing network 191 comprises the three potentiometers 202, 203 and 204, the potentiometer resistances 202 and 204 being serially connected to form a serial circuit, and the third potentiometer resistance 203 being connected in parallel with the aforementioned serial circuit.

The variable taps on these resistances 202, 203, 204 are connected respectively to a normally closed contact on the relay switches 135A, 145A, 150A of the associated relays having respectively the actuating windings 135, 145 and 150. The other switches operated when relay windings 135, 145 and 150 are energized are respectively the switches 135B, 145B and 150B. All of the relay switches are each of the single pole, double throw type.

The movable contacts of switches 135A, 145A and 150A are each respectively connected to the control electrodes of the corresponding thyratron tubes 133, 147, 157 through corresponding decoupling resistances 151, 161 and 171.

The control electrodes of tubes 133, 147 and 157 likewise are connected to the lead 205 through the corresponding resistances 154, 164 and 174.

The cathodes of each one of the devices 133, 147, 157 are interconnected and connected through lead 206 to the cathode of the measuring cathode follower 189. The potential of this lead 206 is varied in accordance with the moisture content of the date to fire the thyratron tubes 133, 147, 157. The screen grids of these tubes 133, 147, 157 may be connected to the lead 206 through corresponding resistances 176, 186, 196, and corresponding condensers 175, 185, 195 are connected between the control grid and cathode of the thyratron devices. The anodes of devices 133, 147, 157 are each connected to their associated cathodes through a serial circuit comprising a condenser and resistance, respectively condenser 152, resistance 153; and condenser 162, resistance 163; and condenser 172 and resistance 173. These anodes are connected respectively to the cathodes of devices 148, 158 and 168 whose associated anodes are connected in a manner described presently to the upper terminal 208 of the secondary winding of the transformer 188 energized with alternating current.

This terminal 208 is connected to the anode of device 168 directly through the relay winding 155, while the other two anodes of devices 158 and 148 are connected to the same terminal 208 through their associated relay windings 145 and 135; but, it is noted that the relay winding 145 is connected to terminal 208 through the normally closed elements of switch 150B while, in similar manner, the relay winding 135 is connected to the same terminal 208 through the serially connected portions of the normally closed switches 145B and 150B. Also, the terminal 208 is connected to the anode of device 183 through the serially connected normally closed portions of switches 135B, 145B and 150B, to provide a positive control voltage useful for a purpose described hereinafter, it being noted that the other terminal of the secondary winding of transformer 188 is connected to lead 206 which, in turn, is connected to the cathode of device 183 through a condenser 178 to thereby normally produce a unidirectional voltage across condenser 178 with the polarity as indicated.

Also, the cathode of the rectifier device 183 is connected to the junction point of resistances 177 and 179. The resistance 179 has one of its terminals connected to the cathode of device 183 and its other terminal connected to the junction of the resistances 182 and 174 and to lead 205. The other resistance 177 is connected between the cathode of device 183 and the normally open contact of each one of the switches 135A, 145A and 150A.

The rectifier device 184, arranged to normally provide a negative control voltage of approximately 150 volts, has its cathode connected to the terminal 208 of the secondary winding and its anode connected to the lead 205 through the resistance 182. It is noted that the condenser 180 is connected between the lead 206 and to the anode of device 184 through resistance 182 so that it is charged so as to normally maintain the lead 205 negative. Also, the anode of device 184 is connected to the lead 206 through the condenser 181. The condensers 180 and 181 and resistance 182 serve as filter elements for the negative voltage produced by device 184 and applied to lead 205.

Thus, the condenser 178 is normally charged to make the lead 209 positive with respect to lead 206. However, when either one of the relay windings 135, 145 or 155 is energized, this condenser 178 is allowed to discharge and in discharging, the condenser 178 discharges through two paths, i. e., a first path includes the path through resistance 179 toward minus 100 volts established by the potential of lead 205, and through a second path which includes the resistance 177 and through the normally open contact of the particular relay switch 135A, 145A, 150A, as the case may be, depending upon which switch is actuated to thereby apply a transient voltage to the grid of the corresponding tubes 133, 147, 157 through resistances 151, 161, 171 respectively, to render such grid progressively from a high positive voltage of 150 volts to a voltage which is negative, and after a short time delay, depending upon the time constant of the two condenser discharge paths, to cause the initially fired tube 133, 147, 157, as the case may be, to cease firing when their corresponding anodes, now supplied with alternating current, become negative also.

The apparatus in Figure 29 is so adjusted that a very dry date passes therethrough without firing any one of the tubes 133, 147 or 157. The tube 133 is fired when the date has a relatively small moisture content above a predetermined moisture content; the tube 147 is fired when the date has a medium moisture content; and the tube 157 is fired when the date has a relatively large moisture content. It will be noted here that in the event that the date has a relatively large moisture content, each one of the tubes 133, 147, and 157 is initially fired but only the solenoid winding 61D, associated with the device 157, is energized. Likewise, when the date has a medium moisture content, tubes 133 and 147 are fired but only the solenoid winding 61C associated with the tube 147 is energized. Likewise, when the date has a relatively small moisture content, above such predetermined low moisture content, the tube 133 is fired and the associated winding 61B is energized. These solenoid windings 61B, 61C and 61D are associated respectively with the solenoids arranged to operate the date deflecting gates 40BB, 40CC, and 40DD, previously described in connection with Figure 16.

The solenoid windings 61B, 61C, 61D, associated with tubes 133, 147 and 157, are connected in parallel respectively with the associated relay windings 135, 145, and 155, each of which has a corresponding shunt connected condenser 149, 159, 169, these solenoid windings preferably having a corresponding serially connected resistor 150, 160, 170. These solenoid windings are so interconnected with respect to the terminal 208 through the switches 135B, 145B that a priority arrangement is provided in that when tubes 133 and 147 are fired, the switch 145B is actuated to disconnect the solenoid 61B from the terminal 208 of the secondary winding, in which case even though the relay windings 135 and 145 are initially energized, only the solenoid winding 61C is energized. Likewise, when a relatively large voltage is delivered from the voltage divider 191 to fire each one of the tubes 133, 147 and 157, each one of the relay windings 135, 145 and 155 are energized but only the solenoid winding 61D is energized, it being noted that when the relay winding 155 is energized, the switch 150B is actuated to thereby disconnect the solenoid windings 61C and 61B from the terminal 208 of the secondary winding.

In operation of the arrangement shown in Figure 29, assuming that a date passes through the electrodes with relatively small moisture content below a predetermined moisture content, the date will not affect operation of the apparatus shown in Figure 29, and such date will pass directly through the electrodes and central tube 40A (Figure 9) without firing any thyratron tubes. Assuming, however, that the date has a moisture content slightly greater than the predetermined low moisture content, a voltage of sufficient intensity is delivered from the tap on resistance 202 through the normally closed contacts of switch 135A and through the decoupling resistance 151 to the grid 137 of device 133. Stated in other words, the potential of the cathode lead 206 is changed to make the grid of device 133 positive with respect to its cathode to initiate firing of the tube 133. As soon as tube 133 is fired, the condenser 152, previously charged with current flowing from the terminal 208 and through switch 150B, 145B, relay winding 135 and tube 148, discharges through the tube 133 to maintain the tube 133 ionized when and as the movable switch elements of the associated relay moves to its other positions wherein its normally open contacts are engaged. This discharge of condenser 152 is suitably prolonged for this purpose by the presence of the serially connected resistance 153. After the relay switch elements are thus moved to engagement with the normally open contacts, it is noted that the grid 137 is then connected through the resistance 151 and resistance 177 to the lead 209 of positive decaying potential; and, also, at the same time, the movable switch element of switch 135B engages its normally open contact member to produce an indication on the lamp 187, and simultaneously to interrupt a charging current path for condenser 178 in which case the condenser 178 discharges through two paths, mentioned previously, toward a potential of minus 100 volts established on lead 205 by rectifier 184. As the condenser 178 is thus discharged through the two aforementioned paths, the voltage of grid 137 gradually becomes negative with respect to its cathode, and since the anode of the device 133 is now supplied with alternating current, the tube will cease firing or become substantially non-conductive again. In order to prevent refiring of the tube when the alternating current wave on the anode of tube 133 assumes a positive value, the condenser 175 with the shunt connected resistance 154 are provided having, at this time, a negative charge thereon to prevent refiring of the tube.

Similarly, when the date having medium moisture content is passed through the electrode system, a sufficient voltage is produced to fire the tubes 133 and 147, but, as mentioned hereinabove, the switch 145B is so connected as to give the circuit associated with the tube 147 priority over the circuit associated with the tube 137, this being accomplished, as mentioned hereinabove, by disconnecting the relay winding 135 from the terminal 208. The operation of the circuit associated with the tube 147 is identical with the operation of the circuit described in connection with the operation of the tube 133. Similarly, the operation of the circuit associated with the thyratron tube 157 is identical with the operation of the circuit associated with the tubes 133 and 147, it being noted that when a sufficient voltage is developed in the voltage divider circuit 191 to initially fire the tubes 133, 147 and 157, only the circuit associated with tube 157 is affected.

Figure 30:
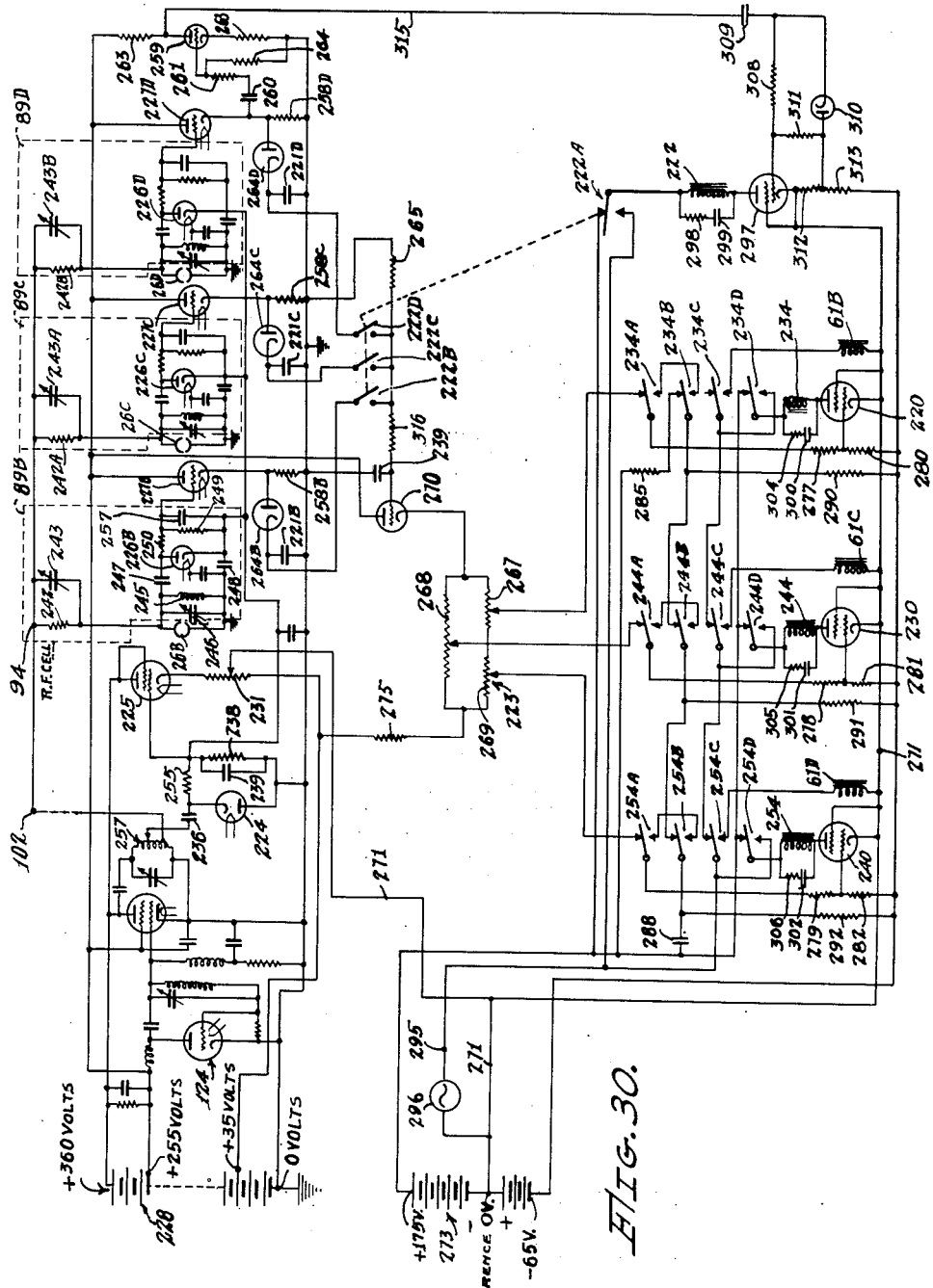
Figure 30 shows another arrangement of electric apparatus whereby additional features of the present invention may be practiced.

Figures 30 and 31 show another circuit arrangement which is preferred in actuating the mechanism of the structure described previously in connection with the description of Figures 1–27 inclusive. Corresponding parts in Figures 30 and 31 have identical reference numerals and Figure 31 is presented to more clearly present certain principles of operation of the circuit shown in Figure 30.

A characterizing feature of the circuit shown in Figure 30 is that the solenoid windings 61B, 61C, 61D are actuated in accordance with substantially the average of three readings taken in differently oriented directions by use of the three electrode condenser structures 26B, 26C, 26D shown in Figures 13 and 30.

Another characterizing feature of the apparatus shown in Figure 30 is that it allows the use of four date channels each fed from a single high-frequency voltage source, as shown in Figures 6 and 35, each channel being effective, as the channel shown in Figure 30, to actuate one of a plurality of gate solenoids in accordance with the average of three different readings taken on the same date.

The apparatus in Figure 30 is adjusted to allow a date of low moisture content below a predetermined magnitude to pass through the apparatus without firing any of the thyratrons. The thyratron tube 220 effects operation of the corresponding date solenoid 61B when a date of slightly greater moisture content than said predetermined moisture content passes through the apparatus. The thyratron tube 230 effects operation of its associated solenoid 61C to separate dates having a medium moisture content, and the third thyratron tube 240 effects operation of its date solenoid 61D to separate dates with relatively high moisture content, i. e., wet dates. A priority arrangement is also incorporated in the circuit shown in Figure 30, in that, when, for example, a date of relatively high moisture content passes through the apparatus, each one of the thyratron tubes 220, 230, 240 is fired but only the date solenoid associated with solenoid winding 61D is actuated.

Similarly, when dates of medium moisture content pass through the apparatus, the thyratron tubes 220 and 230 are each fired but only the gate solenoid associated with solenoid winding 61C is actuated. When dates pass through the apparatus having a moisture content slightly greater than said predetermined low magnitude, only the thyratron tube 220 is fired and its date solenoid associated with winding 61B is actuated.

These three tubes 220, 230 and 240 are each fired in a manner similar to that described in connection with Figure 29, but the magnitude of voltage applied between the control grid and cathode of these individual tubes is in accordance with the average value of three different voltage readings obtained when a date passes successively through the electrode structures 26B, 26C and 26D.

In general, such average voltage for effecting operation of the thyratron tubes is obtained by charging the condensers 221B, 221C and 221D in accordance, respectively, with the moisture content determinations obtained when a date is in electrodes or condensers 26B, 26C and 26D, and thereafter connecting such charged condensers together through the normally open relay switches 222B, 222C and 222D. The average value of voltage thus obtained appears across the voltage dividing network 223 from where selected predetermined portions thereof are applied to the cathode-control grid circuit of tubes 220, 230, 240. For purposes of simplicity, the averaging circuit is omitted in Figure 31 to more readily make apparent the manner in which the voltage differential between the control grid and cathode of the thyratron tubes 220, 230 and 240 are varied to control their firing.

The circuit shown in Figure 31 includes a diode rectifier 224 to develop a reference voltage in accordance with voltage variations of the RF source 124, a reference cathode follower stage 225 to produce increased current variations, a measuring or electrode diode rectifier 226B to develop a rectified voltage in accordance with the moisture content of dates in the electrode or condenser structure 26B, and an associated measuring cathode follower stage 227B arranged to produce an increased output current in its cathode circuit. The output of the reference cathode follower stage 225 is applied to the cathode of the thyratron tube 220, whereas the output voltage developed in the cathode circuit of the measuring cathode follower stage 227B is applied to the control grid of the discharge device 220.

As shown in the simplified diagram of Figure 31, the anodes of devices 225 and 227B are connected to the plus 255 voltage tap of the voltage source 228, having its negative terminal grounded; and the cathodes of devices 225 and 227B are connected to the grounded lead 229 through their associated potentiometer resistances 231 and 232. The variable tap on resistance 232 is connected to the grid of device 220, while the variable tap on resistance 231 is connected to the cathode of device 220.

The thyratron tube 220 is always in condition for firing when its grid becomes positive with respect to its cathode by the continuous voltage source 233 serially connected with the relay winding 234 across the anode and cathode of device 220.

In Figure 31, the R. F. source terminal 235 is connected to the cathode of the reference rectifier 224 through the condenser 236 to develop a unidirectional voltage across the load resistance 238 which has one of its terminals connected to the anode of device 224 through resistance 255 and the other one of its terminals connected to the cathode of device 226B. The filter condenser 239 is connected in parallel with the resistance 238. The voltage developed across resistance 238 is applied to grid of device 225 inasmuch as one terminal of resistance is connected to the grid of device 225. The grid of the reference cathode follower 225 is thus likewise connected to the cathode of the measuring rectifier 226B.

The R. F. voltage source has one of its terminals connected to the ground lead 229 and to the grounded electrode of the date condenser structure 26B. The other electrode of the condenser structure 26B is connected to the other terminal of the R. F. source 124 through a variable voltage adjusting network comprising the shunt connecting resistance 242 and variable condenser 243 to thereby produce an R. F. voltage across the electrode structure 26B. The parallel tuned circuit comprising the coil 245 and variable condenser 246 is connected in shunt with the date condenser 26B; and the ungrounded terminal of the date condenser 26B is connected to the anode of the measuring voltage rectifier 226B through the condenser 247, the cathode of the measuring rectifier 226B being grounded through the condenser 248 to produce unidirectional voltages across the load resistance 249 which has one of its terminals connected to the cathode of the measuring rectifier 226B and the other one of its terminals connected to the anode of the rectifier 226B through the filter resistance 250. A filter condenser 251 is connected in parallel with the resistance 249.

Figure 33:
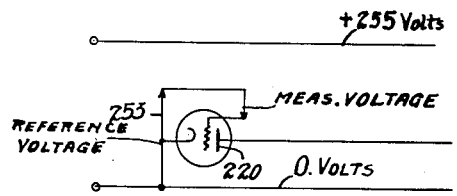
Figures 33 and 34 are vectorial-circuit diagram representations useful in explaining operation of the apparatus shown in Figure 30.
Figure 34:
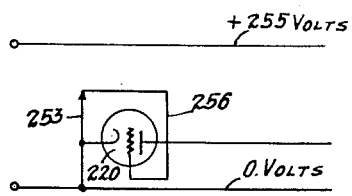

This particular circuit arrangement shown in Figures 30 and 31 allows multi-channel operation inasmuch as the cathode of the thyratron tube 220 has a definite reference voltage and the control grid of the thyratron 220 has a variable voltage applied thereto, as illustrated in the vectorial circuit diagrams in Figures 33 and 34.

In Figure 34, the R. F. reference voltage represented by the vertical vector 253 and measured voltage represented by the oppositely directed or poled vector 256, when low moisture content date appears in the electrode structure, are substantially the same and the cathode of device 220 is thus positive with respect to the control grid in which case the tube does not fire. However, as shown in Figure 33, when a wet date is in the electrode structure, the R. F. reference voltage 253 remains the same but the measured voltage 256, of opposite polarity than the R. F. reference voltage, is considerably smaller than is the case in Figure 34 and the grid of device 220 is at a higher positive potential with respect to the voltage in the cathode in device 220 whereby the tube is fired.

Referring to the actual circuit arrangement employed, shown in Figure 30, the R. F. source comprises a conventional oscillator stage 124 having a variable output tap on the coil of its tank circuit 257 connected to one terminal of condensers 243, 243A, 243B and having another output terminal connected to the cathode of the reference rectifier 224 through condenser 236, the other output terminal of the oscillator stage 124 being grounded.

The grid of the reference follower 225 is connected to the cathodes of each one of the measuring rectifiers 226B, 226C and 226D which are associated respectively with the electrode structures 26B, 26C and 26D. Each one of the measuring rectifiers 226B, 226C, 226D are connected in a similar circuit and are associated respectively with the measuring cathode followers 227B, 227C and 227D. Since the rectifier 226B and its associated cathode follower circuit 227B has been described in detail hereinbefore, and since the measuring stages including the rectifier 226C and 226D are identical in nature, the detailed description of the circuit associated with tube 226B suffices to describe the other two circuits associated respectively with the tubes 226C and 226D, it being noted, however, that the cathode of each one of the measuring cathode follower stages 227B, 227C and 227D is connected to ground through resistances 258B, 258C and 258D, and the cathode of tube 227D is connected to the grid of vacuum tube 259 through the serially connected condenser 260 and resistance 261, which tube 259 has its cathode and grid connected to ground respectively through resistances 263 and 264. The anode of device 259 is connected to the plus 255 volt tap on the voltage source 228 through the serially connected resistance 263.

Each one of the cathode resistances 258B, 258C and 258D associated with the measuring cathode follower tubes has connected in parallel therewith a serially connected diode and condenser, each of identical construction, the anodes of such diodes 264B, 264C, 264D being connected to their associated cathodes of device 227B, 227C, 227D so that the greater the amount of current flowing through resistances 258B, 258C and 258D respectively, the greater becomes the charge stored in the corresponding condensers 221B, 221C and 221D.

The cathodes of the diodes 264B, 264C, 264D are each connected to corresponding terminals of the normally open relay switches 222B, 222C and 222D actuated upon the energization of the relay winding 222. The other contacts of such switches are interconnected and, in turn, connected respectively to ground through the bleeding resistance 265 in the order of 100,000 ohms and to the control grid of the averaging cathode follower stage 270, this grid being also connected to ground through the condenser 239. The anode of device 270 is connected to the plus 255 volt tap on source 228.

The cathode of the cathode follower 270 is connected to one terminal of the voltage dividing circuit 223, comprising in one arm thereof serially connected potentiometer type resistances 267, 269 forming a serial circuit shunted by the third potentiometer type of resistance 268. The other terminal of the voltage divider network 223 is connected through resistance 275 to the plus 35 volt tap on the voltage source 228 and also to one terminal of the potentiometer resistance 231 in the cathode circuit of the reference cathode follower 225. The other terminal of the resistance 231 is connected to the cathode of the reference follower stage 225 while the adjustable tap on the resistance 231 is connected to the "0" voltage reference lead 271 connected to an intermediate point on voltage source 273 and also to the cathodes of each one of the thyratron tubes 220, 230 and 240. The particular connection to the 35 volt tap on source 228 assures proportional voltage division in resistance network 246, on the one hand, and in network 275, 223 on the other hand, such proportional division being substantially independent of the natural bias voltages of cathode followers 225 on the one hand and, on the other hand, tubes 227B, 227C and 227D, operated in parallel with one another functionally and functionally in series with cathode follower 270.

The variable tap on resistance 267, 268 and 269 are connected respectively to the normally closed contact of the single pole double-throw switches 234A, 244A and 254A, which are actuated upon energization of their corresponding relay windings 234, 244 and 254. The movable contacts of such switches 234A, 244A and 254A are connected to the control grids respectively of tubes 220, 230 and 240 through corresponding decoupling resistances 277, 278 and 279, such grids being likewise connected to the minus 65 volt terminal on voltage source 273 through corresponding resistances 280, 281 and 282. The other contact of switches 234A, 244A and 254A are interconnected with the corresponding normally open contacts of switches 234B, 244B and 254B, having their normally closed contacts connected in a serial circuit which extends from the plus 175 volt tap on voltage source 273 through resistance 285, through the normally closed contacts of the single pole double-throw switches 234B, 244B and 254B, and then back to the minus 65 volt tap on voltage source 273 through the compensating resistance 287. It is noted that the condenser 288 is normally connected across the terminals of resistance 285 through the normally closed serial switches 254B, 244B and 234B so that, normally, any charge in condenser 288 is dissipated by the resulting current flow through resistance 285. It is noted further that the resistances 290, 291 and 292 are likewise connected respectively between the movable contacts of switches 234B, 244B and 254B and the minus 65 volt tap on source 273.

The terminal 295 of the alternating current source 296 is connected to a serial circuit comprising the normally closed contacts of relay switches 254C and 244C and the normally open contacts of relay switch 234C and the solenoid winding 61B back to the other terminal of the voltage source 296 which other terminal is connected to the intermediate point on voltage source 273.

Thus, when the switch 234C is actuated, current flows to energize the solenoid 61B. Also, the terminal 295 of the A. C. source 296 is connected to the normally open contact of the single pole double-throw relay switch 222A which has its movable contact normally connected to the plus 175 volt tap on voltage source 273 and also to one terminal of the relay 222, the other terminal of the relay winding 222 being connected to the anode of the averaging thyratron tube 297. A filter circuit comprising a serially connected resistance 298 and condenser 299 may be shunted across the relay winding 222. Energization of such relay winding 222 results in actuation of the switches 222A, 222B, 222C and 222D.

The relay switches 254D, 244D and 234D normally close a circuit extending respectively from the positive outside terminal of source 273 to one terminal of the corresponding relay windings 254, 244 and 234, the other terminal of such relay windings being connected to the anodes respectively of devices 240, 230 and 220. The normally open contacts of the switches 254D, 244D and 234D are connected to the movable contacts of corresponding switches 254C, 244C and 234C respectively.

Each one of the relay windings 234, 244 and 254 is shunted by serially connected resistances and condensers, the condensers 300, 301, 302 and related resistances 304, 305, 306 serving also to supply energy useful to assure complete travel of the relay contacts from their upper position, shown in Figure 30, to their lower position.

The averaging thyratron tube 297 has its cathode and screen grid connected to lead 271 and its control grid connected to the anode of the vacuum tube 259 through the serially connected resistance 308 and condenser 309, the resistance 308 being shunted by a serially connected diode 310 and resistance 311. The junction point of such resistance 311 and the anode of the diode 310 is connected to the junction point of the serially connected resistance 312 and 313 which are connected between the cathode of device 297 and the minus 65 volt terminal on voltage source 273. The lead 315, interconnecting condenser 309 and the anode of the vacuum tube 259, becomes less positive when the date passes through the third or last electrode 26D.

The resistance 265 is a bleeding or discharge resistance of 100,000 ohms. The time constant of the circuit comprising the shunt connected resistance 265 and condensers 221B, 221C, 221D (upon closure of switches 222B, 222C, 222D) is approximately ten milliseconds; and the time constant of the circuit comprising condenser 239 and resistance 316 is approximately one millisecond. The delay provided by the time constant in circuit 316, 239 is to allow equalization of voltages present in condensers 221B, 221C, 221D upon initial closure of relay switches 222B, 222C, 222D to thereby assure equal effect of all of the three condensers on the control grid of follower 270.

In operation of the device in the arrangement shown in Figure 30, assuming that the average value of voltage obtained from interconnecting condensers 221B, 221C, 221D is slightly above a predetermined magnitude corresponding to a dry date, the voltage applied to the grid of thyratron 220 through the variable tap on resistance 267 causes the thyratron tube 220 to fire with the result that an energizing current flows through its associated relay winding 234 in a serial circuit extending from the outside positive terminal of voltage source 273 and normally closed contacts of switch 234D. Such current flow in winding 234 causes the movable contacts of its associated switches to move downwardly in Figure 30, and in order to assure such continued downward movement, the condenser 300 is provided which serves to discharge its energy at a controlled rate determined by the magnitude of resistance 304 through the relay winding 234 to thereby assure continued downward movement of such movable contacts. When the movable contacts of switches 234A, 234B, 234C and 234D thus move downwardly to engage the normally associated open contacts, the connection to the tap on resistances 267 is broken and the control grid of thyratron 220 is connected to one terminal of the normally discharged condenser 288 through a serial circuit comprising the resistance 277, the normally open contacts of switches 234A and 234B, and the normally closed contacts of switches 244B and 254B, the other terminal of condenser 288 being connected to the positive terminal of source 273; consequently, the right hand terminal of condenser 288 to which the control grid of device 220 is connected is progressively charged closer towards minus 65 volts, since such right hand terminal is connected to the minus 65 volt tap on source 273 through the parallel connected resistances 290, 291, 292. When the grid voltage, thus transferred to the grid of thyratron 220 through the condenser 288, becomes negative, the thyratron tube 220 is in condition to be de-energized. In order to allow such de-energization, the anode of thyratron tube 220 is, at this stage, being fed with an alternating current voltage supplied from the terminal 295 of the A. C. source 296 through the normally closed switches 254C, 244C and normally open contacts of switch 234D.

The switches 222B, 222C and 222D are automatically closed to mutually interconnect the condensers 221B, 221C and 221D together automatically after a date passes through the last date electrode or condenser 26D. The mechanism whereby such switches are thus operated in timed relationship with the passage of a date through the apparatus is now described.

The switches 222B, 222C and 222D are each operated, as is the switch 222, when the relay winding 222 is energized. The winding 222 is connected in the anode circuit of the thyratron tube 297, the grid of which is normally at a negative potential with respect to its associated cathode.

It is noted that normally the condenser 350, serially connected between the anode of device 259 and the grid of device 297 through the resistance 308, is charged so that its upper terminal, in Figure 30, is positive. Such charging current for the condenser 350, when it flows, flows from the positive 255 volt tap on voltage source 288 through the resistance 263, through the serially connected resistances 308, 311 and 313, through the lower portion of the voltage source 273, through lead 271, through the lower half of the resistance 231, and then to the positive 35 volt tap on source 228. The condenser 350 is allowed to partially discharge through substantially the same current path while a date is in the electrode 26D.

When a date is in such electrode 26D, the voltage appearing across the resistance 259D is applied through condenser 260 to the control grid of the vacuum tube 259 to thereby lower its anode potential and the potential of the connected lead 315 because of the presence of the voltage dropping resistance 263. As soon as the potential of lead 315 is thus diminished, the condenser 350 discharges through substantially the same current path used in charging the condenser 350, with the exception that the serially connected resistances 311 and 308 are substantially short-circuited for the flow of such condenser discharge current. Thereafter, when the date has left the electrode 26D, the condenser 350 is charged again through the aforementioned current path, a positive transient voltage is applied to the control grid of the thyratron tube 297 to fire the same and completely energize the relay winding 222. Normally, such winding 222 is supplied with unidirectional current from source 273 to also charge the condenser 299. Upon energization of winding 222, the movable contact of switch 222A moves to its lowermost position, and, in the meantime, the relay 222 remains energized with the discharge current from the previously charged condenser 299. After such movable contact of switch 222A completes its travel, the winding 222 and the anode of device 297 is energized with an alternating current from source 296 so that when such transient positive voltage applied to the grid of device 297 substantially disappears, the tube 297 is automatically rendered non-conductive upon the next succeeding occurence of the negative half of the wave applied from source 296 to the anode of device 297, in which case the tube 297 resumes its normally non-firing condition. Thus, the relay winding 222 is energized for a relatively short period of time during which the switches 222B, 222C and 222D are closed to equalize the potentials previous accumulated in the condensers 221B, 221C and 221D. Thus, the relay winding 222 is energized each time a date passes through the last date condenser 26D.

The operation of the apparatus shown in Figure 30 is described hereinabove upon the production of an average voltage in condensers 221B, 221C, 221D slightly above the predetermined voltage, which predetermined voltage corresponds to a very dry date, and, in such case, only the tube 220 is fired as previously described.

When the average value of voltage obtained in the three condensers 221B, 221C and 221D is somewhat higher to correspond with the voltage obtained from a date of medium moisture content, the voltage appearing on the variable taps of resistances 267 and 268 is sufficient to fire both tubes 220 and 230. When the tube 230 is fired, the relay switch 244C is actuated to thereby prevent energization of the solenoid 61B and simultaneously to energize the solenoid winding 61C. These solenoid windings 61B, 61C and 61D serve, as previously described, to direct the gravity flow of a date into corresponding selected chutes depending upon the moisture content of the date.

Further, upon firing of tube 230 and energization of relay winding 244, the condenser 288 is allowed to charge through its charging resistance 291, 292 at a controlled rate. After one of the terminals of condenser 288 acquires a sufficiently negative potential, the grid of device 230 is rendered sufficiently negative to prevent the flow of current through tube 230, especially when, at this time, the anode of device 230 is being supplied with alternating space curent. It is noted that the devices 220, 230 and 240 are each similarly connected and their associated circuits are operated as described in connection with complete operation of device 220.

When a relative wet date passes through the electrode 26B, 26C and 26D, a relatively high average voltage is developed in the condensers 221B, 221C and 221D of sufficient magnitude to fire each of the tubes 220, 230 and 240. When tube 240 is thus fired, an energizing current flows through the relay winding 254 to actuate the switch 254C and to thereby prevent the energization of windings 61B and 61C, in which case only the solenoid winding 61D is energized.

Upon thus firing tube 240, the condenser 288 is allowed to charge, in which case the grid of device 240 gradually becomes sufficiently negative to no longer sustain the flow of alternating space current through the device 240, which, at this time, is being supplied with alternating space curent from the source 296.

The time interval during which either one of the tubes 220, 230 or 240 remains energized is dependent upon the time constant of the circuit connected across the terminals of condenser 288. Preferably, such circuit has the same time constant regardless of the magnitude of voltages initially applied to the control grids of device 220, 230 or 240 from the taps on resistances 267, 268 and 269 respectively. For this purpose, the resistances 290, 291 and 292 are connected as previously described.

An important feature of the arrangement shown in Figure 30 is that it allows the use of a plurality of different similar channels, shown as four in number in the drawings showing the structure of the apparatus. Preferably, when four channels are used, they are supplied with energizing voltages in the manner illustrated in Figure 35 wherein the point 100 on connecting wire 101, connected to the ungrounded output terminal of the high-frequency voltage source, is equidistant from the ends 102, 103 thereof. The ends 102, 103 are, in turn, connected to the midpoint of wires 104 and 105, having their ends respectively connected to the three ungrounded terminals 94A, 94, 94B and 94C of the electrode arrangements. These leads are preferably as short as possible and of equal length, symmetrically disposed.

Figure 32:
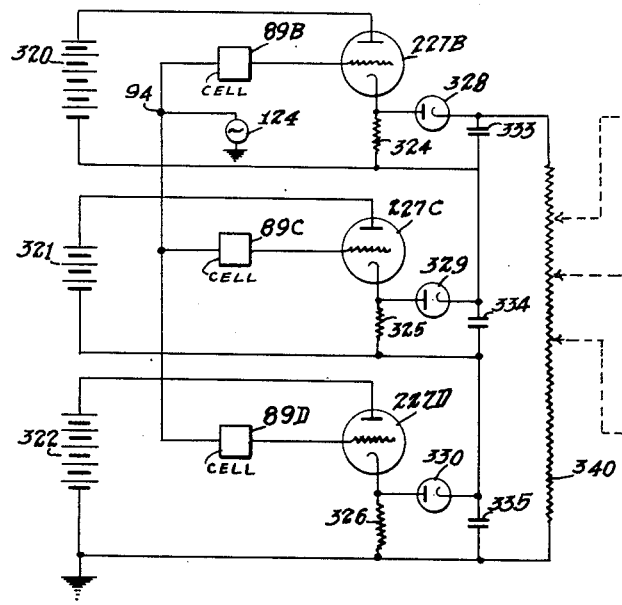
Figure 32 shows another arrangement of apparatus for practicing still additional features of the present invention.

Instead of using an averaging circuit of the type shown in Figure 30, alternatively an "addition" circuit illustrated in Figure 32 may be used. The circuit in Figure 30, however, is preferred since it requires a smaller number of regulated power supplies. In Figure 32, the ungrounded terminal of the high frequency voltage source 124 is connected to the input terminal 94 of the R. F. cells 89B, 89C, 89D, the component parts of which are identical with the component parts in the identically numbered R. F. cells shown in Figure 30, it being noted that these R. F. cells include, in Figure 32, the date electrodes or condensers 26B, 26C, 26D, respectively. The output terminals of such cells are connected to the grid of the associated measuring cathode follower tubes 227B, 227C and 227D. The anodes of the measuring followers are connected respectively to the positive terminals of voltage sources 320, 321 and 322, having their negative terminals connected to the associated cathodes of devices 227B, 227C and 227D through the resistances 324, 325 and 326. The negative terminal of source 322 is grounded. The cathodes of the tubes 227B, 227C and 227D are connected each to the anodes of accumulating rectifiers 328, 329 and 330, having their cathodes connected to one terminal of condensers 333, 334 and 335, the other terminals of such condensers 333, 334 and 335 being returned to the negative terminal of voltage sources 320, 321 and 322. The condensers 333, 334 and 335 thus form a series circuit and such series circuit is shunted by a potentiometer type of resistance 340 having a plurality of adjustable taps thereon connected respectively to a control grid of the thyratron tubes 220, 230 and 240. The anode circuits of these thyratron tubes 220, 230 and 240 are connected and are controlled in a manner described in connection with Figure 30, wherein the corresponding parts have identical reference numerals to effect automatic separation of dates in accordance with the degree of moisture content.

Preferably, the frequency of the high voltage source used in the various modifications is in the order of 30 megacycles. It is noted that essentially the measuring arrangements shown herein serve to measure impedance changes or changes in dielectric constant of the various dates. The various date electrodes and associated circuits are tuned to said frequency of approximately 30 megacycles so that such date electrode circuit is detuned with respect to the frequency of oscillations generated in the high frequency voltage source, the amount of detuning being dependent mainly on the dielectric constant of the particular date in the electrode and also, to some extent, on the conductance or effective ohmic resistance.

A feature of the electrode structure is that they provide volumetric compensation. Usually the dates are not previously graded as to size and it has been observed that the larger dates usually contain a larger quantity of water than a smaller date of the same moisture content percentage; but, when such larger date passes through the electrodes, the electrode fingers are expanded further so that the geometric capacity between the fingers is reduced accordingly to thereby compensate for the volumetric difference.

Another embodiment of the present invention is obtained when the other two date electrodes 26C and 26D, shown in dotted lines in Figure 29, are connected as shown therein in shunt with the other date electrode 26B, previously described in its functional relationship to the other circuit components. In such case, with the addition of date electrodes 26C and 26D, a date passes successively through the electrodes 26B, 26C and 26D and the thyratron tubes 133, 147 and 157, as the case may be, are controlled in accordance with the "wettest" determination made in such three date electrodes. In other words, a date, in passing successively through the electrodes 26B, 26C and 26D, may produce, respectively, a slight, a medium, and a large detuning effect on the associated tuned circuit and, in such case, the thyratron tubes 133, 147 and 157, as the case may be, operate in accordance with the moisture determination when the date is in the electrode 26D, corresponding to the "wettest" determination.

While I have described in the apparatus shown herein for use with comestibles and specifically dates, it is apparent that features of the present invention may likewise be embodied in other moisture determining apparatus useful in, for example, and not as a limitation, apparatus for determining the moisture content of the lumber and inorganic compounds such as sand.

While I have described the above apparatus for selectively classifying materials, essentially a portion of such apparatus is a moisture measuring instrument and, as shown in Figure 31, the moisture content of the material measured in the date electrode 26B may either be determined from the reading obtained on the volt meter 270, having its terminals connected respectively to the cathode and control grid of device 220, or such moisture determination or measurement may be deduced from subtracting the readings taken on the miliammeters 271, 272 connected respectively in the anode circuits of the stages 227B, 225. The volt meter 270 may be calibrated directly in terms of moisture content.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a material grading apparatus of the character described, a high frequency voltage source subject to inherent voltage variations, said source having one of its terminals grounded, a material electrode structure having one of its terminals grounded and energized by said voltage source to produce a control voltage in accordance with an electrical characteristic of the material disposed therein and also in accordance with said inherent voltage variations, a measuring voltage rectifier having its anode connected to the ungrounded terminal of said measuring electrode through a condenser and having its cathode connected to ground through a second condenser, a voltage developing load impedance associated with said measuring voltage rectifier and having one of its terminals connected to said cathode and the other one of its terminals connected to the control grid of a measuring cathode follower stage, a reference voltage rectifier having its anode grounded and its cathode coupled to the ungrounded terminal of said voltage source, a voltage developing load impedance associated with said reference voltage rectifier to develop thereacross a voltage varying in accordance with said inherent voltage variations, a reference cathode follower stage having its control grid connected to one terminal of the last mentioned load impedance, the other terminal of said last mentioned load impedance being grounded, said measuring cathode follower stage and said reference cathode follower stage each having an associated cathode load resistor, a material selecting apparatus comprising an electron discharge device having a cathode and a control electrode, the control electrode of said discharge device being connected to an intermediate point on the cathode load resistance of said measuring cathode follower stage, and the cathode of said discharge device being connected to an intermediate point on the cathode load resistance associated with said reference cathode follower stage to thereby control said selecting apparatus substantially only in accordance with said electrical characteristic of the material and substantially independent of said inherent voltage variations.

2. In a material grading apparatus of the character described, a high frequency voltage source subject to inherent voltage variations, a plurality of electrode structures each successively engaged in turn by material passing therethrough whereby separate and independent measurements may be made in each electrode structure, a material feeding apparatus arranged to successively pass said materials through said plurality of electrode structures, said plurality of electrode structures each being oriented differently to thereby effect a measurement in different directions through a material as it passes through said plurality of electrode structures, each one of said electrode structures being energized by said voltage source and arranged to produce a control voltage in accordance with an electrical characteristic of the material disposed therein and in accordance with said inherent voltage variations, means energized by said voltage source and arranged to produce a reference voltage varying in accordance with said inherent voltage variations, means operable after a material passes through the last one of said plurality of electrode structures to combine the individual control voltages to produce a combined control voltage, a material selecting apparatus, and means connecting said combined control voltage and reference voltage in opposition to thereby operate said material selecting apparatus substantially only in accordance with said electrical characteristic of the material and substantially independent of said inherent voltage variations.

3. In a material grading apparatus of the character described, a plurality of material electrode structures, a condenser associated with each of said material electrode structures for imparting memory to the apparatus, a material feeding apparatus arranged to successively pass in single file a material through said plurality of electrode structures, said electrode structures being arranged to effect measurements on the materials passing therethrough in different directions, means associated with each one of said electrode structures and arranged to charge the corresponding condenser to a voltage proportional to the moisture content of a material, means operable upon the passage of the material through the last electrode structure for mutually interconnecting said condensers to equalize the voltages therein, and a material sorting apparatus operable in accordance with such combined equalized voltage to sort said materials according to their moisture content.

4. In a material grading apparatus of the character described, a plurality of material electrode structures each arranged to effect moisture measurements along different directions of materials therein, means arranged to successively pass materials through such plurality of electrode structures, condenser means associated respectively with each one of said electrode structures to develop therein a charge proportional to the moisture determination made in corresponding electrode structures, means operated upon the passage of a material through the last electrode structure to interconnect said condenser means thereby to equalize the charges developed therein, a material sorting apparatus including an electron discharge device having a cathode and a control electrode, said condenser means having associated therewith a relative short time constant circuit through which the charges in such condenser means are equalized in a relatively short time, and a circuit of relatively long time constant interconnecting said condenser means to said cathode and control electrode to assure predetermined operation of said material sorting arrangement.

5. In a material sorting apparatus of the character described, a plurality of material electrode structures, means arranged to successively feed materials through said plurality of electrode structures, condenser means associated respectively with each electrode structure arranged to accumulate a charge dependent upon the measurement of moisture in the corresponding electrode structure, material sorting apparatus, and circuit means serially connecting said condenser means to develop a control voltage which is the addition of each voltage appearing across said condenser means for operating said material sorting apparatus.

6. In a material sorting apparatus of the character described, an insulating material guide tube, a plurality of individual material condenser structures disposed along the longitudinal axis of said tube, each condenser structure comprising a plurality of resilient fingers, each finger extending inwardly of the tube and in the direction of material passage through the tube.

7. In a material sorting apparatus of the character described, a material guide tube of insulating material having bonded thereon a plurality of condenser structures extending along the longitudinal axis of said tube, each one of said plurality of condenser structures being oriented differently with respect to the orientation of the others so that they are positioned to effectively make measurements in different directions through a material passing through such plurality of condenser structures.

8. In a material grading apparatus of the character described, an insulating material guide tube having a plurality of material condenser structures disposed in spaced relationship along the longitudinal axis of the tube, each condenser structure comprising a plurality of cantilever supporting spring strips extending radially inward into the tube and also in the direction of passage of the material through the tube.

9. In a material sorting apparatus of the character described, a material condenser structure comprising an insulating tube having a plurality of series of cantilever supported resilient fingers extending inwardly into the tube and in the direction of material passage therethrough, each of said series of resilient fingers being spaced longitudinally of said insulating tube and providing separate electrode structures, one only of which is engageable with the material at any given time in the passage of material through said tube.

10. In a material sorting apparatus of the character described, a material condenser structure comprising a material guide tube, a plurality of resilient fingers mounted on said tube and extending radially therein and in the direction of material passage through said tube, the non-supported or free end of said fingers being bent to cooperate with guide slots in said tube to guide movement of said fingers, and an annular stop member mounted within said tube for engagement with intermediate portions of said resilient fingers.

11. In a material sorting apparatus of the character described, a material condenser structure comprising a tube, a plurality of cantilever supported spring strips extending radially in said tube and in the direction of material passage through said tube, the free ends of said resilient strips passing through cooperating guide slots in said tube and being hooked to engage the outer surface of said tube to thereby limit inward radial movement of said fingers, an annular stop member mounted on said tube and arranged to engage intermediate portions of said resilient strips to thereby limit radial outward movement of such strips and guide the passage of a material therethrough.

12. In a material grading apparatus of the character described, a material electrode structure comprising a tube, a plurality of material engaging fingers mounted on said tube and extending radially therein and in the direction of material passage through said tube, said resilient fingers having their opposite ends bent towards one another, one of said bent ends being arranged to pass through said tube and to engage the outer surface of said tube to which tube it is fastened as a cantilever, the other bent end of said resilient strip passing through a cooperating guide slot in said tube and engaging the outer surface of said tube to thereby limit radial inward movement of said resilient strip, an annular stop member mounted on said tube arranged to engage intermediate portions on said fingers to thereby limit radial outward movement of said fingers, and an annular guide member within said tube extending into the electrode structure and partially overlying the cantilever supported ends of said resilient strips.

13. In a material sorting apparatus of the character described, a material guide tube, and a plurality of a series of generally conical shaped electrode structures spaced along the longitudinal axis of said tube, each one of said conical shaped electrode structures comprising a plurality of cantilever supporting resilient members extending radially inward of the tube and in the direction of material passage through the tube, each one of said series of electrode structures being spaced along the longitudinal axis of said tube in an amount such that only one of said series of electrode structures engages the material at any given time in the passage of said material through said tube.

14. In a material sorting apparatus of the character described, a material feeding apparatus arranged to feed material in single file to a gravity feeding point, a tubular electrode structure having its axis pass vertically through said feeding point whereby successively fed materials may pass therethrough under the influence of gravity forces thereon, said tubular electrode structure comprising a plurality of a series of spaced condenser structures arranged to effect measurements in different directions through the material, a plurality of deflecting gate members disposed beneath said tubular electrode structure movable to a position wherein the vertical axis of said tubular condensers intersects the deflecting plates, and means operated in accordance with measurements taken collectively on said plurality of condenser structures for effecting operation of said deflecting means, each of said series of condenser structures being spaced vertically in an amount such that only one of said condenser structures at a time engages said material in its passage through said tubular electrode structure.

15. In a material sorting apparatus of the character described, said apparatus incorporating a plurality of channels through which materials are fed successively in single file, each one of said channels having at least one material electrode, a radio frequency voltage source arranged to energize each one of said electrodes, said voltage source having one of its output terminals connected to an intermediate point on a connector whose opposite ends are connected respectively to the midpoint of a second and third conductor, the ends of said second conductor being respectively connected to a terminal of a corresponding material electrode in different channels, and likewise, the ends of said third conductor being respectively connected to a terminal of a corresponding material electrode in other different channels.

16. In a system of the character described for grading material according to moisture content, a plurality of condensers, means for making a plurality of moisture measurements of said material, said measurement means including means for taking said measurements successively in different mean directions through the material, means charging a corresponding one of said plurality of condensers independently and in accordance with a corresponding one of said plurality of moisture measurements, and means grading said material in accordance with the combined charge developed on said plurality of condensers.

DELBERT J. WARD.

REFERENCES CITED

The following references are of record in the file of this patent:

UNITED STATES PATENTS

| Number | Name | Date |
| --- | --- | --- |
| 791,243 | Carlson | May 30, 1905 |
| 1,495,610 | Paridon | May 27, 1924 |
| 1,962,668 | Olney | June 12, 1934 |
| 2,043,241 | Eyer | June 9, 1936 |
| 2,086,060 | Appleyard | July 6, 1937 |
| 2,095,124 | Cockrell | Oct. 5, 1937 |
| 2,285,152 | Firestone | June 2, 1942 |
| 2,304,765 | Pierce | Dec. 8, 1942 |
| 2,382,168 | Oxley | Aug. 14, 1945 |
| 2,504,731 | Rose | Apr. 18, 1950 |